US012693837B2

(12) United States Patent　　(10) Patent No.:　US 12,693,837 B2

Chiricescu et al.　　(45) Date of Patent:　Jul. 28, 2026

(54) INTERACTION MANAGEMENT FOR SUPERVISED, ASSISTED, OR AUTONOMOUS MODERNIZATION AGENTS OF AN APPLICATION MODERNIZATION PLATFORM

(71) Applicant: FlowX.AI, Inc., Menlo Park, CA (US)

(72) Inventors: Serban-Mircea Chiricescu, Bucharest (RO); Bogdan-Cristian Răduță, Bucharest (RO); Simion-Vlad Bogolin, Bucharest (RO)

(73) Assignee: FlowX.AI, Inc., Menlo Park, CA (US)

( * ) Notice: Subject to any disclaimer, the term of this patent is extended or adjusted under 35 U.S.C. 154(b) by 0 days.

(21) Appl. No.: 19/094,587

(22) Filed: Mar. 28, 2025

(65) Prior Publication Data

US 2025/0306916 A1　　Oct. 2, 2025

Related U.S. Application Data

(60) Provisional application No. 63/570,976, filed on Mar. 28, 2024.

(51) Int. Cl.
G06F 8/70　　　　(2018.01)
G06F 8/34　　　　(2018.01)
(Continued)

(52) U.S. Cl.
CPC .................. G06F 8/70 (2013.01); G06F 8/35 (2013.01); G06F 8/65 (2013.01); G06F 8/71 (2013.01); G06F 9/451 (2018.02); G06V 30/413 (2022.01)

(58) Field of Classification Search
CPC ................................ G06F 8/70; G06V 30/413
(Continued)

(56) References Cited

U.S. PATENT DOCUMENTS

| | | | |
|---|---|---|---|
| 6,275,790 B1 * | 8/2001 | Yamamoto | G06F 8/38 704/8 |
| 6,931,630 B1 * | 8/2005 | Cotner | G06F 8/70 717/126 |

(Continued)

OTHER PUBLICATIONS

Yilin et al., "Research on the Application of Artificial Intelligence Technology in Public Product Design of Intelligent Scenic spot", IEEE, 1-4 (Year: 2020).*

(Continued)

*Primary Examiner* — Anil Khatri
(74) *Attorney, Agent, or Firm* — Volpe Koenig

(57)　　　　　ABSTRACT
A method of application modernization engine executed by processors. The application modernization engine provides an improved contextual document processing and specific information extraction. The method includes receiving, by document intelligence sub-system of the application modernization engine, data of an enterprise computer system generated by artificial intelligence agents. The method includes processing, by the document intelligence sub-system, the data by extracting and ingesting specific contextual information to achieve document classification and feature extraction. The method includes providing, by the document intelligence sub-system, the specific contextual information, the document classification, and the feature extraction to the artificial intelligence agents to implement processes on top of the existing enterprise computer system to achieve objectives.

20 Claims, 15 Drawing Sheets

(51) Int. Cl.

| | |
|---|---|
| *G06F 8/35* | (2018.01) |
| *G06F 8/65* | (2018.01) |
| *G06F 8/71* | (2018.01) |
| *G06F 9/451* | (2018.01) |
| *G06V 30/413* | (2022.01) |

(58) Field of Classification Search

USPC ............................... 717/105–129; 706/21–45

See application file for complete search history.

(56) References Cited

U.S. PATENT DOCUMENTS

| | | | |
|---|---|---|---|
| 6,993,745 | B1 | 1/2006 | Ballantyne et al. |
| 7,516,137 | B1 * | 4/2009 | Earle ...................... G06Q 10/10 |
| | | | 707/999.1 |
| 7,769,757 | B2 * | 8/2010 | Grefenstette ........... G06F 16/30 |
| | | | 707/736 |
| 7,813,822 | B1 * | 10/2010 | Hoffberg ................ H04N 7/163 |
| | | | 381/73.1 |
| 8,407,675 | B1 * | 3/2013 | Clark ........................ G06F 8/52 |
| | | | 717/137 |
| 8,639,542 | B2 | 1/2014 | Berg et al. |
| 8,677,315 | B1 | 3/2014 | Anderson et al. |
| 8,781,882 | B1 * | 7/2014 | Arboletti ............ G06Q 10/0639 |
| | | | 705/7.41 |
| 9,008,447 | B2 * | 4/2015 | King ..................... G06V 30/186 |
| | | | 382/229 |
| 9,213,540 | B1 * | 12/2015 | Rickey ...................... G06F 8/71 |
| 9,223,549 | B1 | 12/2015 | Hermanns et al. |
| 9,274,784 | B2 * | 3/2016 | Wang ........................ G06F 8/70 |
| 9,292,279 | B2 * | 3/2016 | Yang ..................... H04L 45/306 |
| 9,443,192 | B1 * | 9/2016 | Cosic ..................... G06N 5/048 |
| 9,992,230 | B1 | 6/2018 | Haverty et al. |
| 10,332,423 | B2 | 6/2019 | Dellimore et al. |
| 10,503,822 | B1 * | 12/2019 | Spencer ................ G06F 40/197 |
| 10,606,573 | B2 | 3/2020 | Apte et al. |
| 10,671,379 | B2 * | 6/2020 | Chen ........................ G06F 9/454 |
| 10,885,800 | B2 * | 1/2021 | Causevic ............... G16H 20/30 |
| 10,896,532 | B2 * | 1/2021 | Stewart .............. G06F 3/04847 |
| 10,949,175 | B2 * | 3/2021 | Martel .................... G06F 9/451 |
| 11,429,384 | B1 | 8/2022 | Navert et al. |
| 11,467,828 | B1 | 10/2022 | Zhang et al. |
| 11,500,617 | B2 * | 11/2022 | Coan ......................... G06F 8/34 |
| 11,507,489 | B2 * | 11/2022 | Wang ................. G06F 11/3447 |
| 11,620,128 | B1 | 4/2023 | Chawda et al. |
| 11,645,048 | B1 * | 5/2023 | Kirilov ..................... G06F 8/10 |
| | | | 717/108 |
| 11,829,280 | B1 | 11/2023 | Zhang et al. |
| 11,900,087 | B1 | 2/2024 | Zhang et al. |
| 11,922,143 | B1 | 3/2024 | Shapiro et al. |
| 12,020,025 | B1 | 6/2024 | Zhang et al. |
| 12,061,903 | B2 | 8/2024 | Fanning et al. |
| 12,159,101 | B1 * | 12/2024 | Petrescu ................. G06F 9/451 |
| 12,229,299 | B1 | 2/2025 | Huang et al. |
| 2005/0039173 | A1 | 2/2005 | Tondreau et al. |
| 2007/0067756 | A1 | 3/2007 | Garza |
| 2007/0245320 | A1 | 10/2007 | Cotichini et al. |
| 2010/0250497 | A1 * | 9/2010 | Redlich ................. G06Q 10/06 |
| | | | 707/661 |
| 2011/0185346 | A1 | 7/2011 | Andrade et al. |
| 2012/0185821 | A1 | 7/2012 | Yaseen et al. |
| 2015/0127717 | A1 | 5/2015 | Teibel et al. |
| 2015/0227305 | A1 | 8/2015 | Krishnamoorthy et al. |

| | | | |
|---|---|---|---|
| 2017/0115978 | A1 | 4/2017 | Modi et al. |
| 2018/0173999 | A1 | 6/2018 | Renard |
| 2018/0357055 | A1 | 12/2018 | Apte et al. |
| 2019/0342174 | A1 | 11/2019 | Kaneko |
| 2020/0125336 | A1 | 4/2020 | Mills et al. |
| 2021/0019925 | A1 | 1/2021 | Garcia Salvadores |
| 2021/0279066 | A1 | 9/2021 | Xiao et al. |
| 2021/0304118 | A1 | 9/2021 | Durairaj et al. |
| 2022/0137981 | A1 | 5/2022 | Goddard et al. |
| 2023/0061613 | A1 | 3/2023 | Cardozo et al. |
| 2023/0205494 | A1 | 6/2023 | Li et al. |
| 2023/0266970 | A1 | 8/2023 | Aiyer et al. |
| 2023/0401038 | A1 | 12/2023 | Rajagopalan et al. |
| 2024/0031217 | A1 | 1/2024 | Pahud et al. |
| 2024/0086239 | A1 | 3/2024 | Avidan et al. |
| 2024/0201982 | A1 | 6/2024 | Moyal et al. |
| 2025/0110728 | A1 | 4/2025 | Talmor et al. |
| 2025/0199774 | A1 | 6/2025 | Grigore et al. |
| 2025/0291836 | A1 | 9/2025 | Fatal et al. |

OTHER PUBLICATIONS

Assuncao et al., "Contemporary Software Modernization: Strategies, Driving Forces, and Research Opportunities", ACM, pp. 1-33 (Year: 2024).*

Ormani et al., "Drivers of Digital Transformation in SMEs", IEEE, pp. 1-14 (Year: 2024).*

Vidal et al., "Advancing Legacy Software Modernization through Software Product Line Engineering: A Case Study in Digital Libraries", ACM, pp. 1-5 (Year: 2024).*

Leon et al., "On the modernization of systems for supporting digital transformation: A research agenda", ACM, pp. 1-8 (Year: 2021).*

Shi et al., "AgentRE: An Agent-Based Framework for Navigating Complex Information Landscapes in Relation Extraction", ACM, pp. 1-11 (Year: 2024).*

Vidal, "Advancing Legacy Software Modernization through Software Product Line Engineering: A Case Study in Digital Libraries", ACM, pp. 1-5 (Year: 2024).*

Assuncao et al., "Contemporary Software Modernization: Strategies, Driving Forces, and Research Opportunities", ACM, pp (Year: 2025).*

Nitin, "Using AI to Automate the Modernization of Legacy Software Applications," Proceedings on the 39th IEEE/ACM International Conference of Automated Software Engineering, 2024 (pp. 2514-2517).

Krishnan, et al., "Incremental Analysis of Legacy Applications Using Knowledge Graphs for Application Modernization," : Proceedings of the 5th Joint International Conference on Data Science & Management of Data (9th ACM IKDD CODS and 27th COMAD), Jan. 8-10, 2022 (pp. 250-254).

International Search Report and Written Opinion received in PCT/US2025/022120, dated Jul. 11, 2025 (10 pages).

Leon, et al., "On the modernization of systems for supporting digital transformation: A research agenda," SBSI, 2021 (pp. 1-8).

Ramos Vidal, "Advancing Legacy Software Modernization through Software Product Line Engineering: A Case Study in Digital Libraries," Proceedings of the 28th ACM International Systems and Software Product Line Conference, 2024 (pp. 17-21).

Omrani, et al., "Drivers of Digital Transformation in SMEs," IEEE Transactions on Engineering Management, vol. 71, 2022 (pp. 5030-5043).

\* cited by examiner

110

| 101a | 114 |

112

120

122

101c

101b

124

| 101 | 102 |

126

130

132

134

101d 101e 101f

136

180

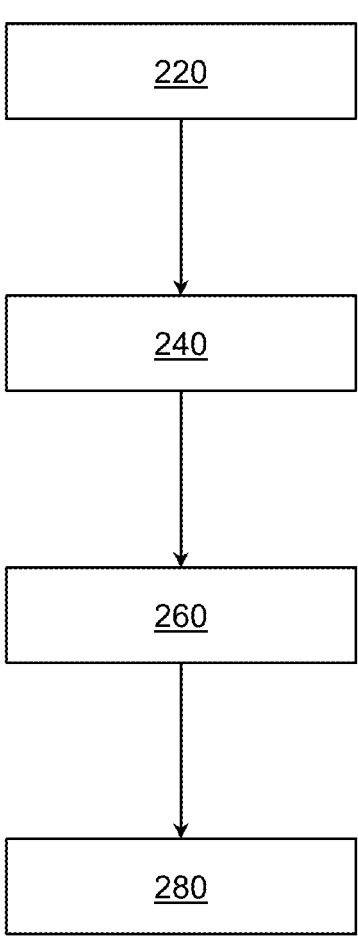
FIG. 2

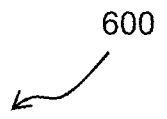
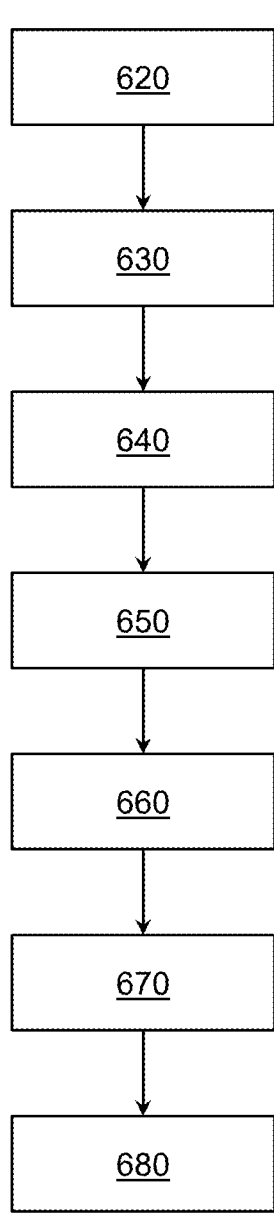
FIG. 6

700

710

701

741    742

720

740

800

810

820

900

910

920

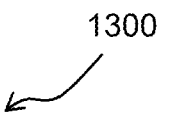
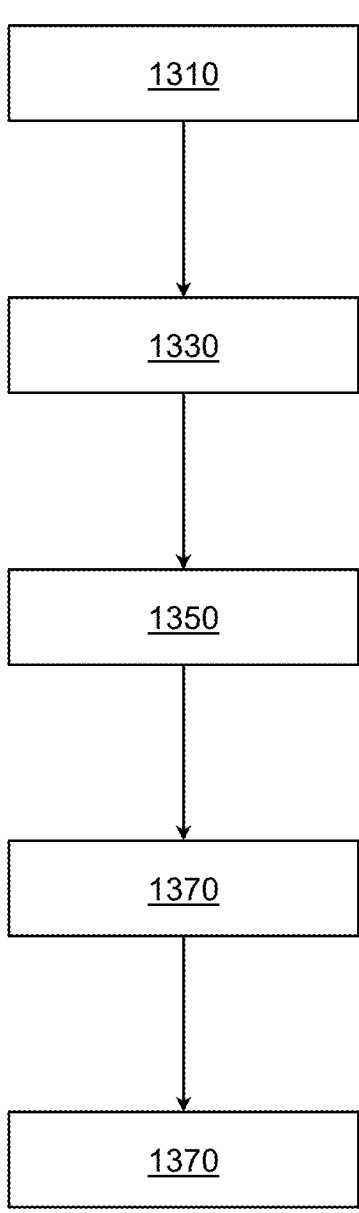
FIG. 13

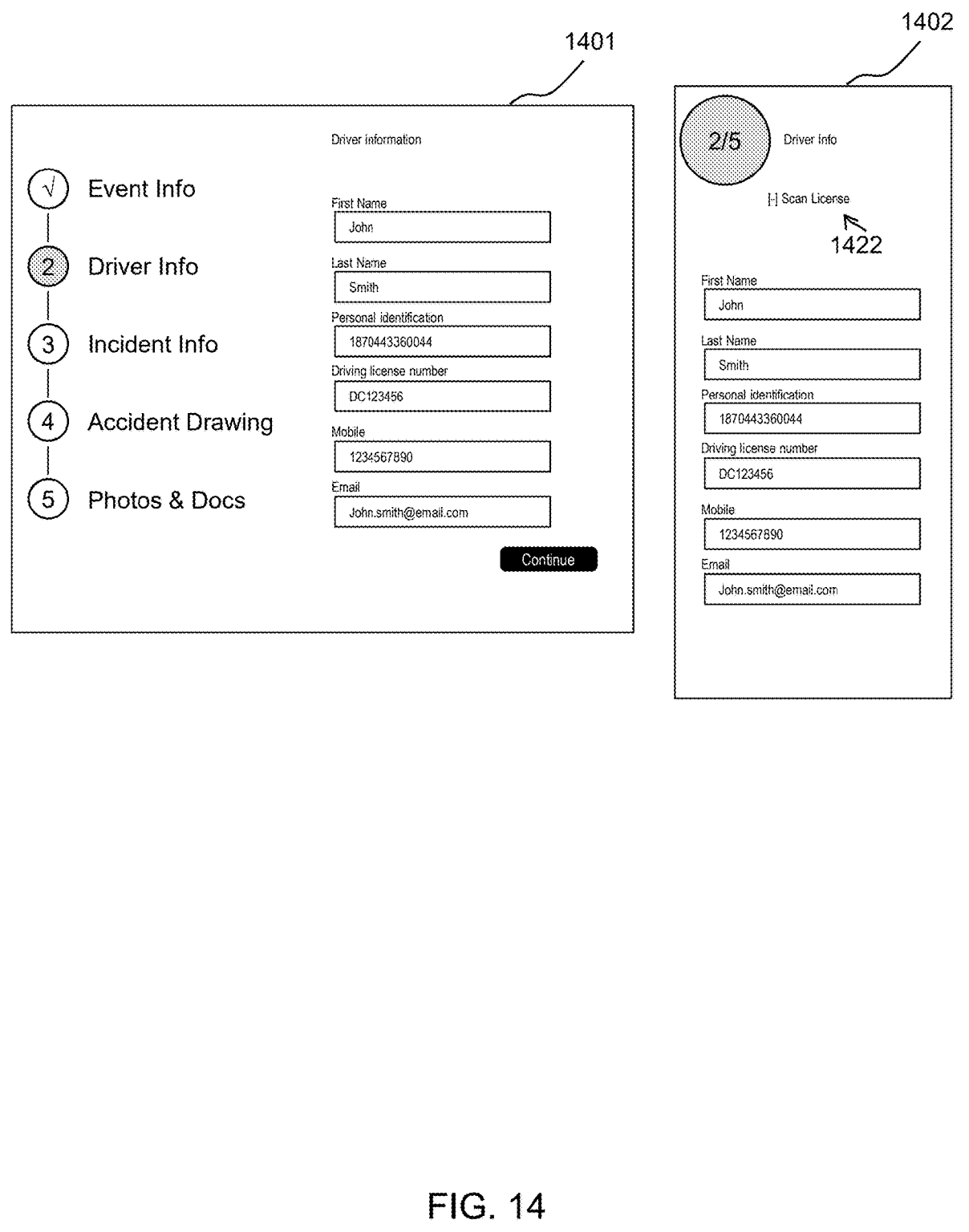

1401

Driver information

√ Event Info

2 Driver Info

3 Incident Info

4 Accident Drawing

5 Photos & Docs

First Name
John

Last Name
Smith

Personal identification
1870443360044

Driving license number
DC123456

Mobile
1234567890

Email
John.smith@email.com

Continue

1402

2/5 Driver Info

[-] Scan License

1422

First Name
John

Last Name
Smith

Personal identification
1870443360044

Driving license number
DC123456

Mobile
1234567890

Email
John.smith@email.com

FIG. 14

INTERACTION MANAGEMENT FOR SUPERVISED, ASSISTED, OR AUTONOMOUS MODERNIZATION AGENTS OF AN APPLICATION MODERNIZATION PLATFORM

RELATED APPLICATION DATA

The present application claims the benefit and priority of U.S. Provisional Application No. 63/570,976, filed on Mar. 28, 2024, the entirety of which is incorporated by reference as if fully set forth herein.

FIELD OF INVENTION

This disclosure is related to application modernization. More particularly, the disclosure herein relates to a system for and a method by an application modernization platform to update, integrate, and service existing enterprise computer systems.

BACKGROUND

Generally, a company can use multiple disparate enterprise software solutions that include thousands of disjointed and inflexible point fixes that are captive to legacy systems and engineering skill shortages. Each enterprise software solution is created and tailored by a different software provider or a development team for management and execution of individual tasks or discrete business objectives. In this regard, the multiple disparate enterprise software solutions are not designed to work together because the individual tasks or the discrete business objectives by their nature are distinct. Also, the disparate enterprise software solutions are generally static software implementations that are unable to receive new, additional, or alternative functionality. The disparate enterprise software solutions can have single purpose User Interfaces (UIs) that operate per user, per device and are also static implementations with limited functionality. Accordingly, as the number of the multiple disparate enterprise software solutions of the company increases, a need for integration of the multiple disparate enterprise software solutions also increases.

Further, each enterprise software solution of the company generates data specific to that enterprise software solution. This specific data grows and changes over an operations lifespan of the enterprise software solutions (e.g., the data becomes non-standardized). However, when the lifespan operations change, the data will need to be integrated into another enterprise software version or a new enterprise software solution. In some cases, the data of a legacy software solution is not compatible with the other enterprise software version or the new enterprise software solution. Also, the disparate enterprise software solutions are unable to accommodate growing/changing data because functionality therein is static. Accordingly, as the data grows and changes, integration of that data becomes more challenging and complex.

Furthermore, each enterprise software solution of the company develops beyond an initial state through versioning and modifications as the individual tasks or the discrete business objectives evolve. In some ways, the multiple disparate enterprise software solutions (and the respective data) drift away from any initial software compatibility because of the versioning and the modifications (e.g., the multiple disparate enterprise software solutions lose communication capabilities). Accordingly, as the company grows and evolves, so does a need for integration of the multiple disparate enterprise software solutions and the data.

Conventionally, the company can attempt to utilize in-house proprietary integration software. In-house proprietary integration software connects one software application of the multiple disparate enterprise software solutions with another, typically through application programming interfaces (APIs). Once connected, the applications can share the specific data and provide updates. Yet, these APIs do not always fully integrate the multiple disparate enterprise software solutions and require continual maintenance and attention. Also, the single purpose user interfaces of the disparate enterprise software solutions can be difficult to change, update, and/or adapt to new APIs. Accordingly, in-house proprietary integration software is costly to develop and, in most cases, does not offer state-of-the-art audit, security, and reliability for the data or the individual tasks.

Thus, there is a need for a solution that improves upon and solves the problems of in-house proprietary integration software by providing modern, seamless, zero-friction digital products and services for application modernization, as well as providing proper mechanisms for developing applications regarding the same.

SUMMARY

According to one or more embodiments, a method of application modernization engine executed by one or more processors. The application modernization engine provides an improved contextual document processing and specific information extraction. The method includes receiving, by document intelligence sub-system of the application modernization engine, data of an enterprise computer system generated by one or more artificial intelligence agents. The method includes processing, by the document intelligence sub-system, the data by extracting and ingesting specific contextual information to achieve document classification and feature extraction. The method includes providing, by the document intelligence sub-system, the specific contextual information, the document classification, and the feature extraction to the one or more artificial intelligence agents to implement one or more processes on top of the existing enterprise computer system to achieve one or more objectives.

According to one or more embodiments, the method embodiment above can be implemented as an apparatus, a system, and/or a computer program product.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 2 illustrates a method according to one or more embodiments;

FIG. 6 illustrates a method according to one or more embodiments;

FIG. 13 illustrates a method according to one or more embodiments; and

FIG. 14 illustrates user interfaces according to one or more embodiments; and

Similar reference characters denote corresponding features consistently throughout the attached drawings.

DETAILED DESCRIPTION

Figure 1:
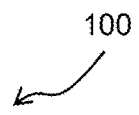
FIG. 1 depicts a system according to one or more embodiments.

Disclosed herein a system for and a method by an application modernization platform (e.g., a FlowX.AI software platform) to update, integrate, and service existing enterprise computer systems. Examples of existing enterprise computer systems include, but are not limited to, banking, customer relationship management, enterprise resource planning, know your customer, accounting, medical, educational information, human resource, legal, operational, process control, and other systems.

According to one or more embodiments, the application modernization platform includes an ability to provide modern, seamless, zero-friction digital integration products and services to companies and users (e.g., customers and employees).

According to one or more embodiments, the application modernization platform includes an ability to provide application development processes with no-code and full-code operations and including augmenting with new functionalities. The application development processes of the application modernization platform includes an ability to provide modern, seamless, zero-friction software through the application development lifecycle to companies and users (e.g., customers and employees).

According to one or more embodiments, the application modernization platform includes an ability to provide omnichannel runtime processes that enable simultaneous operation of multiple user interfaces across multiple systems (e.g., generic, web, Android, iOS, and other operating systems and platforms). The omnichannel runtime processes of the application modernization platform includes an ability to provide services that run business logic defined in an independent omnichannel application to companies and users (e.g., customers and employees) within the multiple user interfaces across multiple systems. Additionally, the omnichannel runtime processes of the application modernization platform that provide application containers (via software development kits (SDKs)) that embed seamlessly into a multi-platform applications and enable the applications to be updated just by editing any part of the underlying process (instead of an SDK for each system).

According to one or more embodiments, the application modernization platform includes an ability to provide artificial intelligence (AI) agents and interaction management of the AI agents to update, integrate, and service existing enterprise computer systems. An AI agent is a software program acting on behalf of another program or a user. Operationally, the AI agent interacts with a user, a system, or other software, gathers information, and self-determines/performs tasks utilizing the information based on objectives. The objectives can be user determined or set by other programs. The AI agent independently decides on one or more actions required for the objectives.

The application modernization platform, the digital integration products and services of the application modernization platform, the modern, seamless, zero-friction software, the omnichannel runtime process, the AI agents, and interaction management of the AI agents practically apply to existing enterprise computer systems of the companies, are easy and satisfying to operate, and assist the companies in achieving individual tasks and discrete business objectives without encumbering the users. Further, the omnichannel runtime process seamlessly integrates with existing enterprise computer systems, offering ease of use while helping companies accomplish individual tasks and specific business objectives without burdening users. Thus, the application modernization platform, the digital integration products and services of the application modernization platform, the modern, seamless, zero-friction software, the omnichannel runtime process, the AI agents, and interaction management of the AI agents provide one or more technical effects, benefits, and advantages over (i.e., provide improvements over and solve problems of) conventional in-house proprietary integration software and single purpose user interfaces. For example, the application modernization platform, the AI agents, and the interaction management enable companies to implement security, provide scalability, provide flexibility, reduce or eliminate software friction, and provide high availability while modernizing and/or integrating the existing enterprise computer systems. Further, users can experience direct assistance and witness real time updates while the companies and users provide the services.

According to one or more embodiments, the application modernization platform and the digital integration products and services thereof can be a processor executable code or software that is necessarily rooted in process operations by, and in processing hardware of, enterprise computer equipment executing the existing enterprise computer systems. The processor executable code or software for the application modernization platform and the digital integration products and services thereof can refer to, collectively, as an application modernization engine. The application modernization engine can include, but is not limited to, all features, innovations, integrations, plugins, and deployments discussed herein.

According to one or more embodiments, the application modernization engine can be an augmentation/expansion package that integrates into, layers on top of, and/or enhances the enterprise computer equipment and existing enterprise computer systems (e.g., supplemental software assisting banking and other systems, as well as assisting a software development process). The application modernization engine can generate and provide one or more user interfaces (UIs) or graphic user interfaces (GUIs), in combination with business process model and notation (BPMN)

tools, to implement the software development process for modernizing and/or integrating the existing enterprise computer systems. BPMN, generally, is a graphical notation of over fifty model elements that defines and depict existing processes and steps therein. Furthermore, the application modernization engine can include machine learning (ML) and/or artificial intelligence (AI) (also referred to in the alternative or in combination as ML/AI) software to update, integrate, and service existing enterprise computer systems. One or more advantages, technical effects, and/or benefits of the application modernization engine can include saving time in, improving quality of, and enhancing creativity of a software development process for modernizing and/or integrating the existing enterprise computer systems. Thus, the application modernization engine particularly utilizes and transforms enterprise computer equipment and existing enterprise computer systems to enable/implement efficient software development that is otherwise not currently available in or currently performed by conventional in-house proprietary integration software and single purpose user interfaces.

According to one or more embodiments, the application modernization engine herein can be practically applied to a banking system. Conventionally, when a bank is on boarding in a new customer at a branch, a teller uses multiple applications and systems to manually enter data multiple times on behalf of the new customer to determine whether the new customer is actually at the bank for the first time or returning because the multiple applications and systems are not synchronizing automatically and take time to use. The application modernization engine layers on top of the multiple applications and systems to integrate any underlying data while providing a new GUI. Accordingly, the teller enters a new customer number (e.g., a social security number) once in the new GUI, which triggers all applications and systems to be checked and the customer is on boarded seamlessly (e.g., without the teller knowing of the application modernization engine operations).

According to one or more embodiments, the application modernization engine herein can be practically applied to a product catalog of a bank. Conventionally, each item of the product catalog is individually offered, but is not able to be provided in a bundle because each item is associated with a different application and system (e.g., savings accounts are separate from credit card accounts, which are further separate from automobile loans). The application modernization engine layers on top of the multiple applications and systems to integrate any underlying product catalog so that an augmentation can now exist for providing a bundle (e.g., sign up for a savings account while receiving a credit card and a car loan).

FIG. 1 depicts a system 100 according to one or more embodiments. The system 100 is an example in which one or more features, innovations, integrations, plugins, and deployments of an application modernization engine 101 herein can be implemented. All or part of the system 100 can be used to collect information (e.g., data and/or a training dataset) for and/or used to implement the application modernization engine 101 as described herein.

The application modernization engine 101 comprises processor executable instructions executable by one or more processors of the system 100 that enable companies to implement security, provide scalability, provide flexibility, reduce or eliminate software friction, and provide high availability while modernizing and/or integrating existing enterprise computer systems within the system 100. The processor executable instructions of the application modernization engine 101 further include digital integration products and services (e.g., front end and back end components that can be installed on-premises or other systems), as well as one or more UIs or GUIs. According to one or more embodiments, the application modernization engine 101 can create any type of external or internal facing application, redesign business processes from analog paper-based processes to fully digital and automated processes, manage integrations of existing enterprise computer systems and data, and read process definitions. In operation, the application modernization engine 101 runs business processes, coordinates integrations, and provides an omnichannel as event-driven platform that orchestrates, generates, and integrates with any type of existing enterprise computer systems, without expensive or risky upgrades. According to one or more embodiments, the application modernization engine 101 can provide ML/AI software 102 to assist with updating, integrating, and servicing.

According to one or more embodiments, the functionality of the application modernization engine 101 can be implemented throughout the system 100. As represented by separate instances 101a, 101b, 101c, 101d, 101e, and 101f, for example, the application modernization engine 101 can include an augmentation/expansion package that integrates into, layers on top of, and/or enhances enterprise computer equipment and existing enterprise computer systems across an application layer 110, a backend microservice layer 120, and an integration layer 130 of the system 100. Examples of the separate instances include a designer application 101a, an administrator application 101b, one or more core extensions 101c, one or more plugins 101d, one or more integration connectors 101e, and one or more container applications 101f.

The application layer 110 of the system 100 includes one or more customer and/or user applications 112 (e.g., final clients), as well as BPMN tools 114 for use by the application modernization engine instance 101a (e.g., the designer application 101a). The backend microservice layer 120 includes one or more databases 122, 124, and 126 for use by at least the application modernization engine instances 101b and 101c (e.g., the administrator application 101b and the one or more core extensions 101c). The integration layer 130 includes one or more queues 132, one or more connectors 134, and an integration designer 136, for use by at least the application modernization engine instances 101d, 101e, and 101f (e.g., the one or more plugins 101d, the one or more integration connectors 101e, and the one or more container applications 101f).

FIG. 1 also provides one or more existing enterprise computer systems 180. Examples of the existing enterprise computer system 180 include, but are not limited to, banking, customer relationship management, enterprise resource planning, know your customer, accounting, medical, educational information, human resource, legal, operational, process control, and other systems.

The designer application 101a of the application modernization engine 101 resides within the application layer 110. The designer application 101a provides a collaborative, no-code/full-code, web-based application development environment, designed to facilitate a creation of web and mobile applications without a need for coding expertise. According to one or more embodiments, the designer application 101a provides process development capabilities (e.g., based on BPMN 2.0 standards and/or the BPMN tools 114), configures user interfaces for these processes (e.g., both generated and custom), and defines business rules and validations (e.g., via decision model and notation (DMN)

files, MVFLEX expression language (MVEL), or other scripting languages). The designer application 101*a* also creates integration connectors (e.g., the one or more integration connectors 101*e*) in a visual manner, designs data models for the customer and/or user applications 112, adds new capabilities by using plugins (e.g., the one or more plugins 101*d*), and manages user access roles, as well as provides containerized micro-services architecture (e.g., the one or more container applications 101*f*). According to one or more technical effect and benefits, the designer application 101*a* of the application modernization engine 101 builds new applications or execution flows via the one or more plugins 101*d*, the one or more integration connectors 101*e*, and the one or more container applications 101*f* to extend the existing enterprise computer system 180. The designer application 101*a* can operate automatically, without human intervention. The designer application 101*a* can operate during a runtime of the one or more existing enterprise computer systems 180, as well as with respect to a controlled, isolated environment for design and testing operations.

For example, the designer application 101*a* of the application modernization engine 101 includes the BPMN tools 114 to perform a software development process for modernizing and/or integrating the existing enterprise computer system 180. Further, the application modernization engine 101 and the BPMN tools 114 CAN provide a "no data model" model to build (e.g., step by step) a business flow so that users do not spend time on complex data mappings when building an application, which is different from conventional software development. Furthermore, the application modernization engine 101 and the BPMN tools 114 CAN provide a "no data model" model to build (e.g., step by step) a business flow to avoid time and resource consuming task or process mining operations for the complex data mappings of conventional in-house proprietary integration software. Instead, the application modernization engine 101 and the BPMN tools 114 automatically create needed data points while designing the software for the business flow.

According to one or more embodiments, the designer application 101*a* can generate native applications (e.g., as the web and mobile applications) for the customer and/or user applications 112 of the user devices from a single software development process. The native applications are not hybrid or responsive applications, which are conventional. The native applications reside within an operating system of the user device. In this regard, the native applications of the application modernization engine 101 provide the UIs and GUIs that look seamless within the customer and/or user applications 112 (e.g., rather than a website interface of the conventional hybrid or responsive applications). By way of example, the designer application 101*a* can create three separate GUIs and corresponding native applications for iOS, Android, and Angular using a single no-code software development process that provides full code for each. Further, any modifications to the three separate GUIs and corresponding native applications can be made by the designer application 101*a* by changing the full code that then updates the three separate GUIs and corresponding native applications through a refresh (e.g., zero-redeploy operation). Additionally, the designer application 101*a* is able to automatically push updates to the customer and/or user applications 112 (e.g., no requirements to wait for user actions).

The administrator application 101*b* of the application modernization engine 101 resides within the backend microservice layer 120. The administrator application 101*b* can be utilized for storing and editing process definitions by connecting to the one or more databases 122, 124, and 126, ensuring consistency in data management with the application modernization engine 101 and instances thereof.

The integration designer 136 provides and builds integration services. The integration services of the integration designer 136 permit administration of integrations (e.g., the integration connectors 101*e*) via a visual interface. Accordingly, the integration designer 136 supports integrations that utilize representational state transfer (REST), simple object access protocol (SOAP), and Java® database connectivity (JDBC) to define workflows that aggregate multiple services into a functionality, and which can be used in the application modernization engine 101. REST is a design style providing simple, scalable, and stateless communication between client and server by treating data as accessible resources (e.g., using HTTP methods like GET, POST, PUT, and DELETE). SOAP is a protocol to create web APIs that allow components of the system 100 to communicate with each other. JDBC is an API within the Java programming language that allows interactions with relational databases.

According to one or more embodiments, the integration designer 136 can define workflows that authenticate and authorize with external services, call functions of the services, perform transformations of data, and define business decisions to integrate as a functionality in an application so that the application modernization engine 101 provides an easier and improved way of connecting to the external systems (e.g., does not go through Kafka®). Note that, because building external integrations is very complex and computer resource intensive, the application modernization engine 101 builds logic on top to improve design speed and provide faster deployment executions.

According to one or more embodiments, the integration designer 136 can provide integrations where the application modernization engine 101 is migrating the existing enterprise computer system 180 from other platforms (e.g., Apian®, Pega®, Unqork®, etc.).

The one or more core extensions 101*c* of the application modernization engine 101 resides within the backend microservice layer 120. The one or more core extensions 101*c* can provide import/export functionality, as well as management automation wraps installers, executables, and scripts, for the system 100 and the application modernization engine 101. By way of example, the one or more core extensions 101*c* can include a license manager, a content manager, and a scheduler. The license manager can display usage reports related to the application modernization engine 101 within the designer application 101*a* and ensure transparent monitoring and management of the system 100. The content manager can enhance core system capabilities with functionality specific to taxonomies. The content manager can manage various content types, for example, by utilizing enumerations, substitution tags, content models, languages, source systems, and media library. The scheduler can include, e.g., a reminder application for receiving requests to remind users of an amount of time to do something.

The one or more plugins 101*d* of the application modernization engine 101 include bits of functionality that allow expansion of the system 100. For example, the one or more plugins 101*d* can include, but are not limited to, notifications, documents, optical character recognition (OCR), task management, reporting, and other custom backend systems, which can be installed on a client server, server of the application modernization engine 101, or other server or database of the system 100. A task management plugin can include a software extension that adds features specifically designed for managing tasks. Examples of managing tasks include creating task lists, assigning deadlines, and tracking progress. A document plugin can include a software extension that adds specialized functionality related to document viewing and/or editing (e.g., thereby providing advanced actions on documents without needing a separate application). A notification plugin can include a software extension that adds display messages or alerts to inform on important events, updates, or actions that require attention. The other custom backend systems can include a risk control plugin that adds functionality related to identifying and assessing software errors, security dangers, and other potentials for disaster.

The application layer 110 of the system 100 includes one or more customer and/or user applications 112 that users (e.g., customers and employees) download, install, load, and execute on user devices (e.g., mobile and laptop devices). The customer and/or user applications 112 can be mobile, web-based, offline, or other functionality. Examples of the customer and/or user applications 112 include, but are not limited to, Android® applications, iOS® applications, and Anqular® applications.

The backend microservice layer 120 of the system 100 includes where applications or microservices are built as a collection of small, independent services that communicate with each other through well-defined APIs. Each microservice of the backend microservice layer 120 is designed to perform a specific business capability and can be developed, deployed, and scaled independently of other services. Each microservice of backend microservice layer 120 can include breaking down an application into smaller, modular components with all the necessary dependencies and configurations included. Dependencies and configurations can include relationships and settings, respectively, where a component relies on another component (e.g., libraries, frameworks, operating systems, software applications, and other components) to function correctly. For example, a Python® application can depend specific libraries or a web application can depend on a JavaScript® framework.

The one or more databases 122, 124, and 126 can be any server or storage mechanism that provides process definitions, notation code, existing enterprise computer systems and data, and other data utilized by the application modernization engine 101 and instances thereof. For example, the database 122 can be a source-available, cross-platform, document-oriented database that utilizes JavaScript object notation (JSON) or JSON-like documents with optional schemas to provide data to the application modernization engine 101 and instances thereof. Further, the database 124 can be an open-source relational database management system (RDBMS) emphasizing extensibility and structured query language (SQL) compliance that provides automatically updatable views, transactions with atomicity, consistency, isolation, durability (ACID) properties, materialized views, foreign keys, triggers, and stored procedures to provide data to the application modernization engine 101 and instances thereof. Furthermore, the database 126 can be in-memory storage, used as a distributed, in-memory key-value database, cache and message broker, with optional durability to provide data to the application modernization engine 101 and instances thereof.

According to one or more embodiments, the integration layer 130 includes the one or more queues 132 and the one or more connectors 134. The integration layer 130 includes the one or more plugins 101d, the one or more integration connectors 101e, and the one or more container applications 101f of the application modernization engine 101. Accordingly, the application modernization engine 101 at least offers two integration levels to extend functionality. The integration layer 130 orchestrates and integrates with any legacy system (e.g., the existing enterprise computer system 180) without costly upgrades to provide connector technology, which enables seamless integration with connectors built by the application modernization engine 101 in various programming languages. In this regard, the application modernization engine 101 shifts business logic from any connector 134 to a process itself, and acts as a buffer between a backend and new digital experiences.

According to one or more embodiments, the integration layer 130 automatically utilizes existing authentication/authorization infrastructure of the existing enterprise computer system 180. Generally, authentication can verify an identity, while authorization can govern actions. Authentication can be a prerequisite to authorization. Authentication can also include, but is not limited to, protecting the application modernization engine 101 and the existing enterprise computer system 180 (and data therein) from unauthorized access. Authorization can also include, but is not limited to, implementing role-based access control (RBAC) and attribute-based access control (ABAC) to govern access or permissions.

One or more technical effects, advantages, and benefits of the integration layer 130 and the application modernization engine 101 include an unparalleled flexibility (e.g., in contrast to the static nature of conventional software development) in creating the connectors 134 in any development language (e.g., supporting Kafka integration). Further, one or more technical effects, advantages, and benefits of the integration layer 130 and the application modernization engine 101 include providing digital apps (e.g., that are often hindered by core system loads in conventional software development) that experience no delays and boast a rapid response time (e.g., 0.2 seconds).

The one or more queues 132 are representative of a unified platform or handling all the real-time data feeds (e.g., Apache Kafka, which is an open-source distributed event streaming platform that can handle a high volume of data and enables message passing from one end-point to another). The one or more queues 132 support low latency message delivery and provide a guarantee for fault tolerance in a presence of machine failures. The one or more queues 132 handle diverse consumers and operate very fast, e.g., by performing two (2) million writes/sec. Accordingly, the integration layer 130 in combination with the one or more queues 132 is capable of handling millions of processes, messages, and data transactions per day, which conventional systems (as well as humans) are unable to handle. Note that millions of processes, messages, and data transactions are also outside the scope and ability of the human mind.

Accordingly, the integration layer 130 includes built in controls and mechanisms to manage surges in usage, surges in data, and surges in processing. The controls and mechanism of the integration layer 130 protect the system 100 from inconsistency that may block the operations of the customer and/or user applications 112. Accordingly, the integration layer 130 includes caching to alleviate pressure from the existing enterprise computer system 180. The integration layer 130 in combination with the one or more queues 132 can also safeguard against spikes from the existing enterprise computer system 180, implement queuing, and perform retry mechanisms.

The one or more connectors 134 can include microservices that listen for events, process received data, interact with the existing enterprise computer system 180 (if required), and send the data back to the one or more queues 132.

Turning now to FIG. 2, a method 200 (e.g., performed by the system 100 of FIG. 1) is illustrated according to one or more embodiments. The method 200 addresses a need to improve upon and solve the problems of in-house proprietary integration software by providing modern, seamless, zero-friction digital products and services for application modernization. The method 200 is implemented during a runtime of the existing enterprise computer system 180, thereby coordinating hundreds or thousands of calculations per second that that are outside the scope and ability of the human mind. To the extent that the method 200 can be implemented in a controlled, isolated environment for design and testing operations, the method 200 would still require hundreds or thousands of calculations per second or greater that are also outside the scope and ability of the human mind.

The method 200 begins at block 220, where the application modernization engine 101 connects the system 100 to the existing enterprise computer system 180. As the existing enterprise computer system 180 can include data (e.g., first data) and one or more enterprise interfaces, the application modernization engine 101 can connect the system 100 to this data and/or these enterprise interfaces. The application modernization engine 101 can utilize APIs or any other mechanism as described herein to connect with the existing enterprise computer system 180. The connections can include, but are not limited to, one or more server side communications, one or more server side communications using REST/HTTP, one or more event queue communications using Kafka, one or more authentication communications using OpenID, and one or more API protocol communications.

The connection between the system 100 and the existing enterprise computer system 180 enables the application modernization engine 101 to automatically analyze the data and the enterprise interfaces to determine operations, context, themes, scope, errors, etc. By way of example, the application modernization engine 101 can analyze the first data and operations within the existing enterprise computer system 180, along with process definitions, notation code, etc. of the databases 122, 124, and 126, to identify aspects of the existing enterprise computer system 180 that require reviving, augmenting, modernizing, or any combination thereof.

At block 240, the application modernization engine 101 revives the existing enterprise computer system 180. Reviving is when the application modernization engine 101 builds a new modern experience on the existing enterprise computer system 180 using the data of the existing enterprise computer system 180. Reviving can include utilizing existing APIs or any other mechanism of the existing enterprise computer system 180 to the new modern experience on the existing enterprise computer system 180. For example, the new modern experience can include new modern dynamic UI elements or new UIs with the modern dynamic UI elements that leverage the data of the existing enterprise computer system 180. In some cases, the new modern experience operates seamlessly with the one or more enterprise interfaces. According to one or more embodiments, the term "modern" with respect to dynamic UI elements means that the dynamic UI elements include a present or advanced graphic look and feel that is opposed to and improvement on past interface styles so as to provide a new user experience. According to one or more embodiments, the term "new" means that the experience or dynamic UI elements did not exist prior to operations of the application modernization engine 101. According to one or more embodiments, the term "dynamic" means that the experience or dynamic UI elements are flexible, adaptable, and capable of change or action, as opposed to "static" conventional in-house proprietary integration software that is fixed or unchanging.

Reviving can include, e.g., a core revival. Core revival can include building modern digital products and deployment of the modern digital products on top of the existing enterprise computer system 180. The modern digital products read and write data while providing a new interface that replaces the one or more enterprise interfaces. For instance, the one or more digital products read the first data from and write second data back to the existing enterprise computer system 180 and/or the system 100. The one or more digital products provide one or more corresponding interfaces (e.g., the new modern experience instead of the one or more enterprise interfaces) seamless with the enterprise computer system 180.

At block 260, the application modernization engine 101 augments the existing enterprise computer system 180 and/or the system 100. Augmentation is different from revival because revival relates to updating current features of the existing enterprise computer system 180, while augmentation relates to adding capabilities that are not part of the existing enterprise computer system 180.

More particularly, the application modernization engine 101 augments the existing enterprise computer system 180 and/or the system 100 with one or more new capabilities. The one or more new capabilities extend the existing enterprise computer system 180. The one or more new capabilities include, but not limited to, process development capabilities, UIs, business rules and validations, the one or more plugins 101*d*, the one or more integration connectors 101*e*, and the one or more container applications 101*f*.

At block 280, the application modernization engine 101 modernizes the existing enterprise computer system 180 and/or the system 100. Modernization is different from revival and augmentation because modernization includes removing, isolating, and/or replacing active components from the existing enterprise computer system 180 and/or the system 100 while maintaining business continuity.

More particularly, modernizing by the application modernization engine 101 can include, but is not limited to, decommissioning legacy systems with no business discontinuity while continuing to implement digital products on top of the existing enterprise computer system 180 and/or the system 100. Decommissioning is an operation by which the application modernization engine 101 removes and/or replaces active components from the existing enterprise computer system 180 and/or the system 100, while ensuring proper data backup measures, authentication and authorization operations, and digital product implementations are taken before completely shutting the components down. Business continuity can include maintaining critical business functions and operations at an acceptable level even when modernizing the existing enterprise computer system 180 and/or the system 100. The acceptable level can be defined by the system 100, such as maintaining one or more features as active or providing continuous connectivity within the system 100.

Modernizing by the application modernization engine 101 can include, but is not limited to, decoupling application runtimes from integrations using an event queue. Decoupling is an operation by which the application modernization engine 101 configures software components to be as independent as possible from each other by minimizing dependencies. In turn, the application modernization engine 101 permits separate and individualized development, maintenance, and updates of the software components without significantly impacting other parts of the system 100. The event queue is a data structure storing events (e.g., user inputs, network requests, or system notifications) in an order for further processing by the application modernization engine 101 and the software components being modernized. The event queue assists the application modernization engine 101 with maintaining business continuity.

Accordingly, using decommissioning operations, decoupling operations, events queues, the one or more plugins 101*d*, the one or more integration connectors 101*e*, and the one or more container applications 101*f*, the application modernization engine 101 streamlines operations, improves memory and processor efficiency, eliminates security risks, maintains business continuity, and reduces costs by removing outdated components of the existing enterprise computer system 180 without critical business function and operation failure or interruption. Further examples of technical effects, benefits, and improvements of the application modernization engine 101 include improved design speeds and faster deployment executions, especially in the case where the application modernization engine 101 decouples application runtimes by minimizing or eliminating dependencies (e.g., significant processing resources can be regained).

Additionally, as the application modernization engine 101 modernizes the existing enterprise computer system 180 and/or the system 100, new and/or custom designed components (and other services) can leverage core functionality. For example, core functionality can include, but is not limited to, auditing, storing and serving content (text, image, video, document), indexing and searching data, and scheduling delayed jobs (recurrent or single time jobs).

Figure 3A:
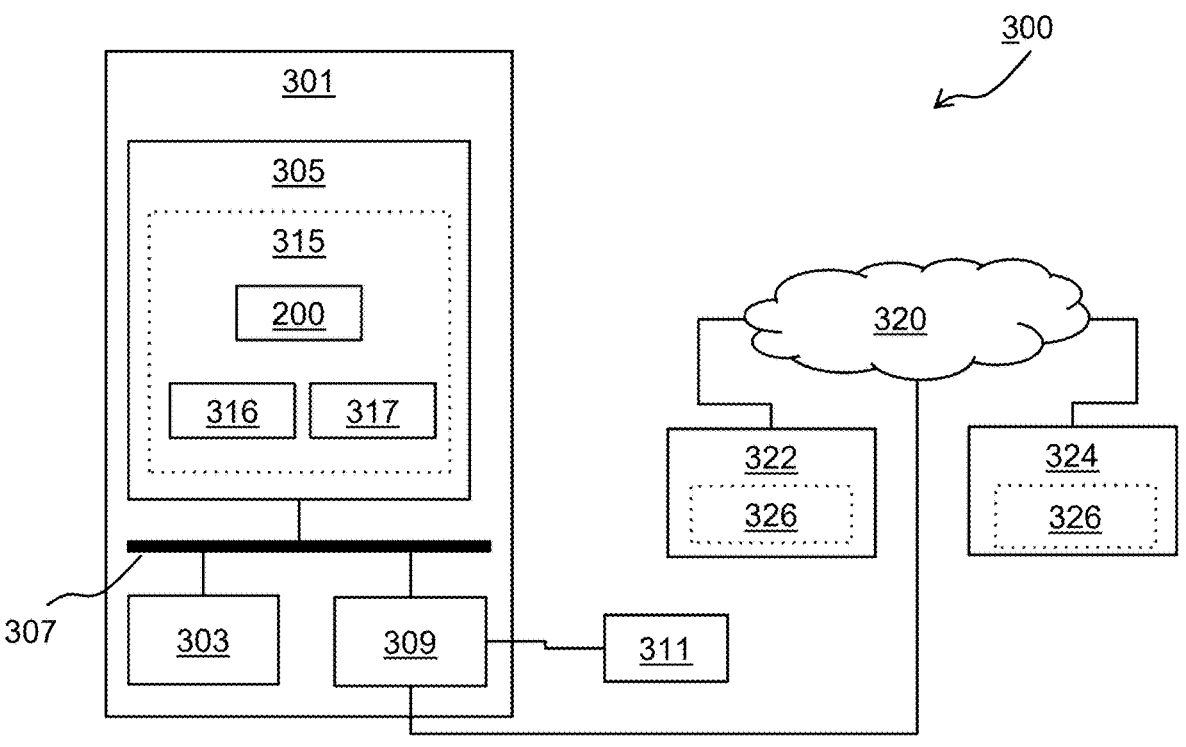
FIG. 3A depicts a system according to one or more embodiments.

Turning now to FIG. 3A, a diagram of a system 300 is depicted in which one or more features herein can be implemented according to one or more embodiments. The system 300 can be representative of any combination of one or more computing devices, computing apparatuses, and computing environments, which comprise hardware and software. Further, embodiments of the system 300 disclosed may include apparatuses, systems, methods, and/or computer program products at any possible technical detail level of integration.

As shown in FIG. 3A, the system 300 includes an apparatus 301. The system 300 and the apparatus 301 may be adapted or configured to perform as a distributed system, an online platform, a server, a client device, an embedded computing system, a personal computer, a console, a personal digital assistant (PDA), a cell phone, a tablet computing device, a quantum computing device, a cloud computing device, a mobile device, a smartphone, a fixed device, a smart display, a wearable computer, a robotic or other humanoid device, a robot, or other device. According to one or more embodiments, the apparatus 301 can be practically applied as a stand-alone implementation in a discrete device.

The apparatus 301 includes one or more processors 303, at least one memory 305, and a system bus 307. The one or more processors 303 can be collectively or generically referred to as a processor 303. The one or more processors 303 are coupled via the system bus 307 to the at least one memory 305 and various other components.

The processor 303 may be any type of general or specific purpose processor, including a central processing unit (CPU), field programmable gate array (FPGA), application specific integrated circuit (ASIC), graphics processing unit (GPU), quantum computing device, controller, multi-core processing unit, three dimensional processor, or any combination thereof. The processor 303 may also have multiple processing cores, and at least some of the cores may be configured to perform specific functions. Multi-parallel processing may also be configured.

The system bus 307 (or other communication mechanism) is configured for communicating information or data to the processor 303, the at least one memory 305, and various other components. The system bus 307, for example, can communicate with the 309 and the devices 311. According to one or more embodiments, the adapters 309 may be connected to one or more I/O buses that are connected to the system bus 307. According to one or more embodiments, the devices 311 can include, but are not limited to, one or more displays (e.g., a display and a second display), transducers, cameras, audio outputs, microphones, and other devices. Examples of the one or more displays can include, but are not limited to, a plasma, a liquid crystal display (LCD), a light emitting diode (LED), or other display. The other devices or transducers can include a keyboard, a computer mouse, a touchpad, a touch screen, a keypad, etc. may be further coupled through the adapters 309 to the system bus 307 for input to the apparatus 301

The at least one memory 305 can be collectively or generically referred to as a memory 305 and may include volatile media, non-volatile media, or other media. The memory 305 is an example of a (e.g., non-transitory) computer readable storage medium accessible by the processor 303 and can include any media that is removable, non-removable, or other media. The memory 305 can include any combination of a read only memory (ROM), a random access memory (RAM), internal or external Flash memory, embedded static-RAM (SRAM), solid-state memory, distributed memory, cache, static storage, or any other types of volatile or non-volatile memory. For example, the ROM is coupled to the system bus 307 and may include a basic input/output system (BIOS), which controls certain basic functions of the apparatus 301, and the RAM is read-write memory coupled to the system bus 307 for use by the processors 310.

The memory 305 stores the computer instructions for execution by the processor 303. The memory 305 can store software 315 (e.g., the application modernization engine 101 described herein) as components, modules, models, algorithms, scripts, applets, instructions, and other code for execution by the processor 303 to cause the apparatus 301 and/or the system 300 to operate, for example, as described herein with reference to FIG. 2 (e.g., the method 200 of FIG. 2 is represented within the software 315 of FIG. 3A).

According to one or more embodiments, the software 315 can be configured in hardware, software, or a hybrid implementation and composed of components, modules, models, applets, instructions, algorithms, scripts, and other code that are in operative communication with one another, and to pass information or instructions. Further, the components, modules, models, algorithms, applets, instructions, scripts, and other code of the software 315 can be implemented as a hardware circuit comprising custom very large scale integration (VLSI) circuits or gate arrays, off-the-shelf semiconductors for example, transistors, logic chips, or other discrete components, in programmable hardware devices (e.g., field programmable gate arrays, programmable array logic, programmable logic devices), graphics processing units, or other logic, as well as be at least partially implemented in software for execution by various types of processors 303. According to one or more embodiments, an identified unit of executable code of the software 315 may include one or more physical or logical blocks of computer instructions that may, for instance, be organized as an object, procedure, routine, subroutine, or function of a module of executable code. According to one or more embodiments, one or more identified units of executable code of the software 315 can be co-located or stored in different locations such that, when joined logically together, comprise a module of executable code. A module of executable code may be a single instruction, one or more data structures, one or more data sets, a plurality of instructions, or other instructions distributed over several different code segments, among different programs, across several memory devices, or other devices. The software 315 of FIG. 3A can also be representative of an operating system, a mobile application, a client application, or other applications for the apparatus 301 for the system 300. According to one or more embodiments, the software 315 can be practically applied as an augmentation/expansion package integrating into, layering on top of, and/or enhancing existing enterprise computer systems (e.g., supplemental software assisting banking and other systems). According to one or more embodiments, the software 315 can be implemented as a computer program product that is necessarily rooted in the processor 303 to improve operations of the apparatus 301 and the system 300.

According to one or more embodiments, the software 315 generates and provides one or more UIs or GUIs 316, for example, directly, in combination with the existing enterprise computer systems, and/or on behalf of the existing enterprise computer systems or other applications and/or as needed. The one or more UIs or GUIs 316 include, but are not limited to, window interfaces, internet browsers, and/or other visual interfaces for applications, operating systems, file folders, and other applications/systems. User activity can include any interaction or manipulation of the one or more UIs or GUIs 316 provided by the software 315. According to one or more embodiments, the one or more UIs or GUIs 316 can collectively prompt, obtain, organize, and present data 317 with respect to the user activity.

The data 317 can include, but is not limited to, non-standardized information received by the software 315 and standardized information generated by the software 315 by manipulating the non-standardized information. Examples of the data 317 include, but are not limited to, prompts, video, audio, analysis results, scores, sub-scores, application status, banking information, medical information, educational information, geographic information, demographic information, and other non-standardized and standardized information. Examples of the data 317 also include, but are not limited to, preference information, bibliographic information, communications, text, models, training information, and other non-standardized and standardized information. The data 317 can also include, but is not limited to, operational or functional data within the software 315, and may be embodied in a suitable form and organized within any suitable type of data structure. In some embodiments, the software 315 can generate feedback as the data 317.

According to one or more embodiments, the software 315 includes and executes custom modules to perform application specific processes or derivatives thereof, such that the system 300 may include additional functionality. For example, according to one or more embodiments, the software 315 may be configured to store information, instructions, commands, or data 317 to be executed or processed by the processor 303 to logically implement the method 200 of FIG. 2. Thus, by way of example, the memory 305 including the software 315 as processor executable instructions can be included in the apparatus 301, which also includes the processor 303, that performs any of the methods described herein.

According to one or more embodiments, the software 315 includes and executes ML/AI software (e.g., custom ML/AI, ML/AI algorithms, and/or ML/AI modules) to provide seamless application modernization for existing enterprise computer systems. The ML/AI software of the software 315 can be configured to create, build, store, and provide algorithms and models that improve automatically through experience, as well as emulate 'natural' cognitive abilities of humans while processing data amounts that are outside the scope and ability of the human mind. In an example, ML of the software 315 uses training data (e.g., data 317) to build a particular model and to improve that model, while AI of the software 315 perceives an environment (e.g., receives the non-standard information) and takes actions (e.g., performs a multi-step manipulation of the non-standardized information to generate standardized information) to solve a problem and/or produce an output. Note that the data amount of non-standard information, as well as its form, and the speed of the multi-step manipulation are such that no practical situation exists where a human could use a pencil and paper to solve the problem and/or produce the output.

According to one or more embodiments, the ML/AI software of the software 315 provides an AI Core (e.g., the system 100 of FIG. 1) with an ability to make decisions based on user input, as well as operate within certain parameters. The ML/AI software of the software 315 provides access to the AI Core to a suite of tools that uses the software 315 utilizes to build or fine-tuned models (e.g., large language models or LLMs) for individual tasks or discrete business objectives, as well as natural language processing. Examples of the fine-tuned models (e.g., used as base models) of the ML/AI software include, but are not limited to, all-MiniLM-L6-v2, Mistral 7B, Mixtral 8x7B, Llava 1.6 7B, Falcon-7B-Instruct, and other tine-tuned models and transformers. Examples of the ML/AI software and frameworks include, but are not limited to, Microsoft Autogen, Langchain, ChromaDB, and other ML/AI frameworks.

The software 315 can be LLM agnostic, as it can be interconnected with multiple language models or LLMs. The software 315 can leverage an agent and tool architecture to solve various tasks that are related or connected with the data 317. The agent and tool architecture can include AI agents that act in an intelligent manner by perceiving an environment, taking actions autonomously to achieve goals, and improve performance upon learning or acquiring knowledge. The ML/AI software of the software 315 can utilize frameworks and libraries to create and modify AI agents and applications using AI agents.

One or more advantages, technical effects, and/or benefits of the ML/AI software of the software 315 include, but are not limited to, providing the AI agents for AI-assisted development to companies and users to save time, improve quality, and enhance creativity. The AI Core revolutionizes application development by automating up to 80% of the process, significantly speeding up the creation of digital products while ensuring the're adaptable and user-centric. For example, the AI agents of the ML/AI software of the software 315 can provide users with suggestions that are relevant and diverse to a software development for a business process, generate content much faster (e.g., new processes or business rules tailored to the need) for the software development for the business process, and provide various UI adaptations. Further, the AI agents of the ML/AI software of the software 315 can provide features to improve a quality of a content by checking for grammar, spelling, punctuation, and readability issues and offering suggestions to improve said issues. The AI agents of the ML/AI software of the software 315 can optimize features for the business process and/or nodes in the business process and enhance user creativity by providing different perspectives, angles, and examples to enrich content and make content more engaging and persuasive.

With respect to the one or more adapters 309 of FIG. 3A, the apparatus 301 can include one or more of an input/output (I/O) adapter, a device adapter, and/or a communications adapter. The I/O adapter can be configured with any wireless or wired device/transceiver for communication. The device adapter interconnects the devices 311 to the system bus 307. The communications adapter (e.g., a communications device) interconnects the system bus 307 with a network 320, which may be an outside network, enabling the apparatus 301 to communicate data with other devices through the network 320 (e.g., for example, a remote device 322 and/or a cloud device 324).

The devices 311 can be configured to provide the one or more UIs or GUIs 316 of the software 315, as the users interact with the apparatus 301 and the system 300. One or more inputs (e.g., the data 317) may be provided to the apparatus 301 by any of the devices or transducers connected to the device adapter. In addition, one or more inputs may be provided to the system 300 remotely via another computing system in communication therewith, or the apparatus 301 may operate autonomously.

The processor 303, in executing the software 315, can be configured to receive, process, and manage the data 317, and communicate the data 317 to the memory 305 for storage and/or across the network 320 via the adapter 309. Data 317 from the remote device 322 and the cloud device 324 can also be received by the processor 303 through the adapter 309.

The network 320 can be a wired network, a wireless network, or include one or more wired and wireless networks. According to an embodiment, the network 320 can include one or more of an Intranet, a local area network (LAN), a wide area network (WAN), a metropolitan area network (MAN), a direct connection or series of connections, a cellular telephone network, or any other network or medium capable of facilitating communication between the apparatus 301, the remote device 322, and the cloud device 324.

According to one or more embodiments, the functionality of the apparatus 301 with respect to the software 315 can also be implemented on the remote device 322 and/or the cloud device 324, as represented by separate instances 326 and 328 of the software 315. As an example, the processor 303 and the memory 305 are representative of processors and memories of the remote device 322 and/or the cloud device 324. According to one or more embodiments, the system 300 can be practically applied as a comprehensive multi-instance software across multiple devices connecting multiple users to augment/expand existing enterprise computer systems (e.g., supplemental software assisting banking and other systems). Note that the data 317 can be stored in a common repository located at the apparatus 301, the remote device 322, and/or the cloud device 324 and can be downloaded (on demand) to and/or from each of the apparatus 301, the remote device 322, and/or the cloud device 324. Thus, by way of example, the software 315 can be distributed across the system 300 to perform any of the methods described herein. According to one or more embodiments, the apparatus 301, the remote device 322, and/or the cloud device 324 can be any combination of software and/or hardware that individually or collectively store, execute, and implement the software 315 and/or the separate instances 326 and 328 and functions thereof. Further, the apparatus 301, the remote device 322, and/or the cloud device 324 can be an electronic, computer framework comprising and/or employing any number and combination of computing device and networks utilizing various communication technologies, as described herein. The apparatus 301, the remote device 322, and/or the cloud device 324 can be easily scalable, extensible, and modular, with the ability to change to different services or reconfigure some features independently of others. By way of example, the cloud device 324 can provide an abstract layer for deploying outputs (e.g., including AI models) of the system 300 into any cloud or on-premises infrastructure.

In operation, the apparatus 301 can continually or periodically obtain, monitor, store, process, and communicate via network 320 the data 317. Further, the apparatus 301, the remote device 322, and the cloud device 324 are in communication through the network 320. For example, the remote device 322 can be a stationary/standalone device, a base station, a desktop/laptop computer, a smart phone, a smartwatch, a tablet, or other device configured to communicate with other devices via the network 320. The cloud device 324, implemented as a physical server on or connected to the network 320 or as a virtual server in a public cloud computing provider (e.g., Amazon Web Services (AWS)®) of the network 320, can be configured to communicate with the remote device 322 via the network 320. Thus, the data 317 can be communicated throughout the system 300.

In operation, the apparatus 301, utilizing the software 317\5, observes/obtains the data 317 of the system 300, stores the data 317 in the memory 305, and shares this data 317 across the system 300 via the adapter 309.

Figure 3B:
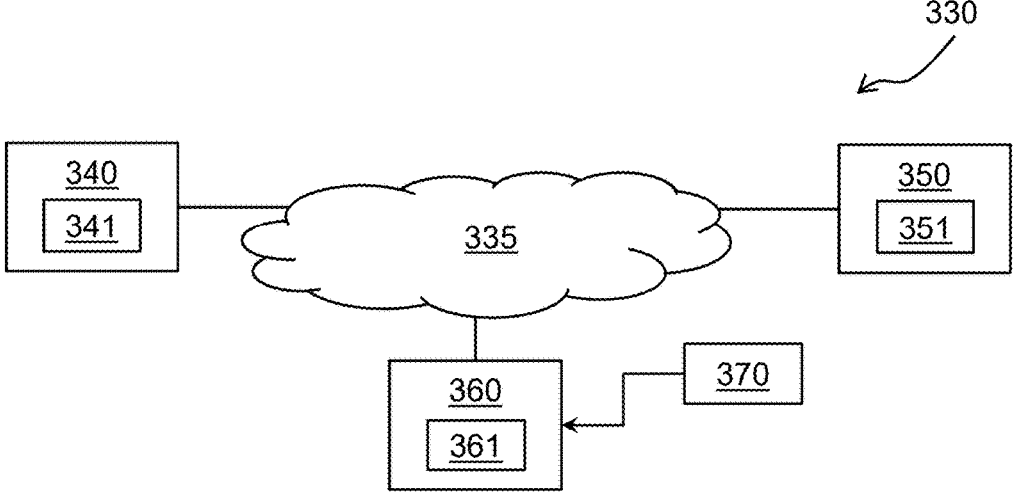
FIG. 3B depicts a system according to one or more embodiments.

FIG. 3B depicts an environment 330 according to one or more embodiments. The environment 330 includes a network 335, a first system 340 supporting a software platform 341, a second system 350 supporting a software platform 351, and a third system 360 supporting a software platform 361, which is being engaged by a user 370. The features and elements of the environment 330, as well as the one or more corresponding one or more operations of the environment 330, can be performed individually or in combination in any of an online environment, an offline environment, a backend processing environment, a local processing environment, a remote processing environment, a cloud processing environment, and/or other environment. Thus, the third system 360 and the software platform 361 can be provided and executed as a standalone service or integrated with a broader offering of other services by the first and second systems 340 and 350 related to application modernization.

According to one or more embodiments, the first system 340, the second system 350, and the third system 360 can be any computing system (e.g., the apparatus 301, the remote device 322, or the cloud device 324) and include any hardware and software as needed to execute the methods described herein. The first system 340 is an example of a server and the software platform 341 is an example of the web-based application/tool, as described herein. The first system 340 and the software platform 341 can connect and communicate via the network 335 to the second system 350 and the third system 360, and vice-versa, as needed to execute the methods described herein. The second system 350 and the third system 360 can connect and communicate to the first system 340 and the software platform 341 using a web browser or application that loads the one or more UIs or GUIs 316, as the software platforms 351 and 361 can be implemented as client instances of the software platform 341, or independent instances. Thus, the environment 330 contemplates implementing web-server, client-server, local processing, and/or other models. The user 370 can be representative of one or more users (whether a software engineer, an administrator, or other user category) interacting with the third system 360.

Figure 4A:
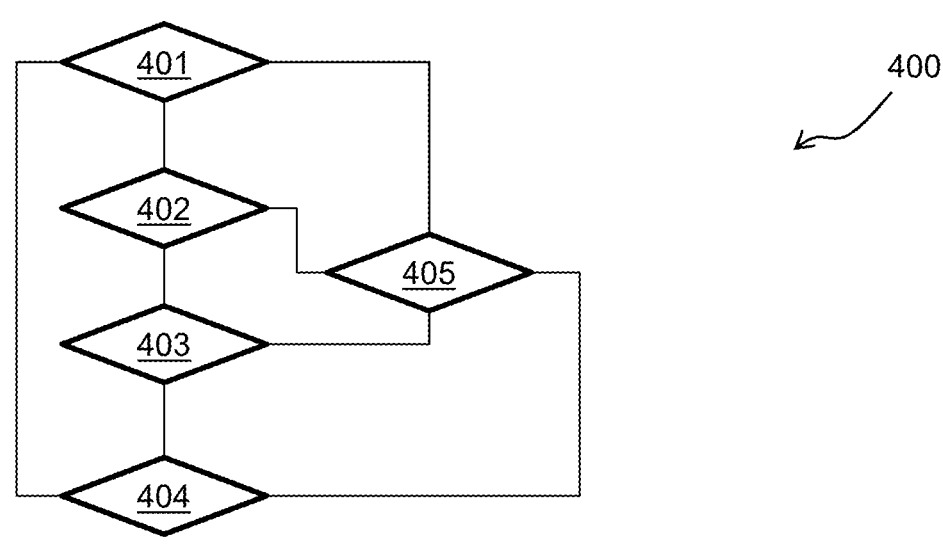
FIG. 4A depicts a system according to one or more embodiments.
Figure 4B:
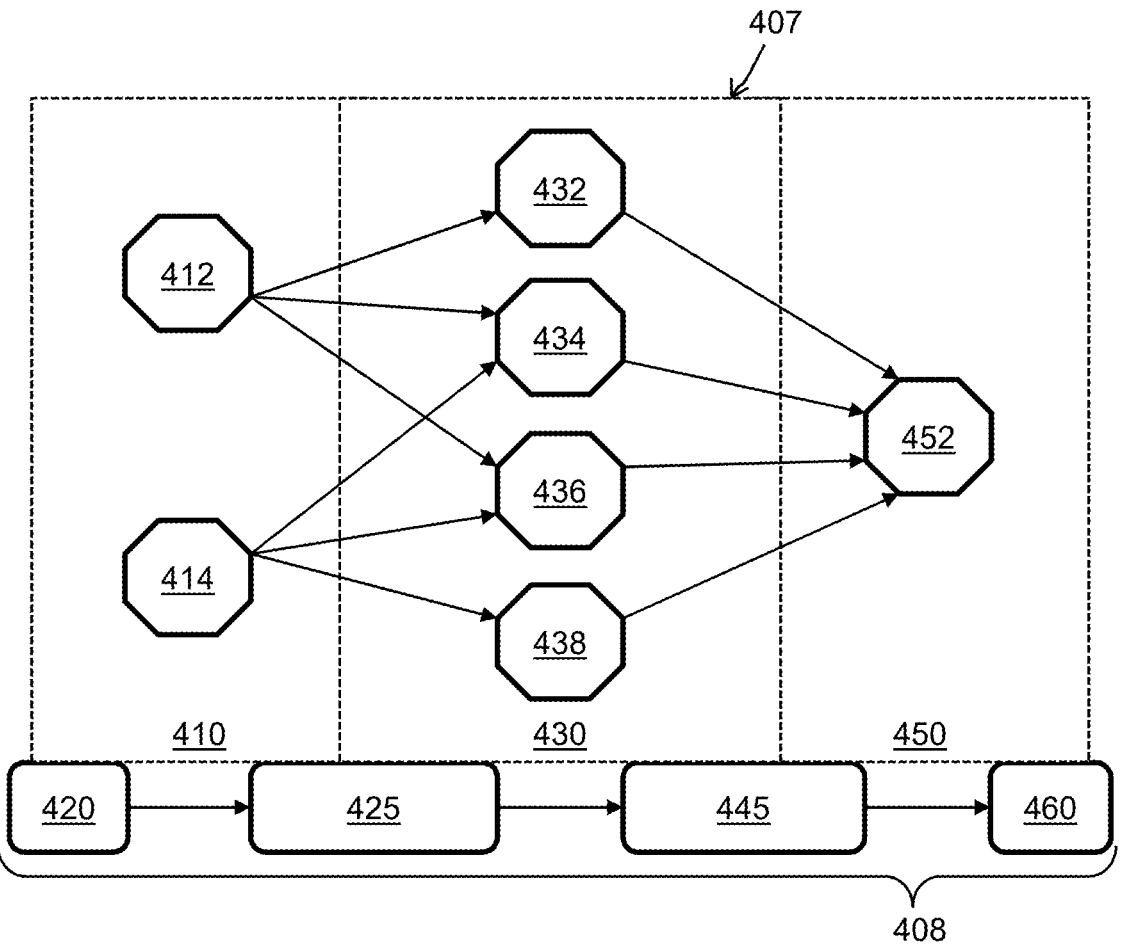
FIG. 4B depicts a neural network and a method performed in the neural network according to one or more embodiments.

In operation, the apparatus 301, utilizing the software 315, can utilize models, neural networks, ML, and/or AI to provide seamless application modernization for existing enterprise computer systems. By way of example, and according to one or more embodiments, FIG. 4A depicts a system 400, and FIG. 4B depicts a neural network 407 and a method 408 performed in the neural network 407. The description of FIGS. 4A-4B is made with reference to FIG. 3 for ease of understanding where appropriate. More particularly, the system 400, the neural network 407, and the method 408 are examples of models, neural networks, ML, and/or AI of the system 300 and the software 315.

As shown, the system 400 includes data 401 (e.g., the data 317 of FIG. 3) that can be stored on a memory or other storage unit (e.g., the memory 305 of FIG. 3). Further, the system 400 includes a machine 402 and a model 403, which represent aspects of the software 315 of FIG. 3 (e.g., the custom ML/AI software therein). The machine 402 and the model 403 together can generate an outcome 404. The system 400 can include hardware 405, which can represent the apparatus 301 of FIG. 3. In general, the ML/AI algorithms of the system 400 (e.g., as implemented by the software 315 of FIG. 3) operate with respect to the hardware 405, using the data 401, to train the machine 402, build the model 403, and predict the outcomes 440. For instance, the machine 402 operates as a software controller executing on the hardware 405. The data 401 (e.g., the data 317 of FIG. 3) can be on-going data (continuously collected) or output data associated with the hardware 405. The data 401 can also include currently collected data, historical data, or other data from the hardware 405 and can be related to the hardware 405. The data 401 can be divided by the machine 402 into one or more subsets. Further, the machine 402 trains, which can include an analysis and correlation of the data 401 collected. In accordance with another embodiment, training the machine 402 can include self-training, for example, by the software 315 of FIG. 3, utilizing the one or more subsets. In this regard, for example, the software 315 of FIG. 3 learns.

Moreover, the model 403 is built on the data 401. Building the model 403 can include physical hardware or software modeling, algorithmic modeling, and/or other modeling that seeks to represent the data 401 (or subsets thereof) that has been collected and trained. In some aspects, building of the model 403 is part of self-training operations by the machine 402. The model 403 can be configured to model the operation of hardware 405 and model the data 401 collected from the hardware 405 to predict the outcome 404 achieved by the hardware 405. Predicting the outcomes 440 (of the model 403 associated with the hardware 405) can utilize a trained model 403. Thus, using the outcome 404 that is predicted, the machine 402, the model 403, and the hardware 405 can be configured accordingly.

Thus, for the system 400 to operate as described, the ML/AI algorithms therein can include one or more neural networks (e.g., the neural network 407 of FIG. 4B). In general, the neural network 407 is a network or circuit of neurons, or in a modern sense, an artificial neural network (ANN), composed of artificial neurons or nodes or cells. For example, an ANN involves a network of processing elements (artificial neurons) which can exhibit complex global behavior, determined by the connections between the processing elements and element parameters. These connections of the network or circuit of neurons are modeled as weights. A positive weight reflects an excitatory connection, while negative values mean inhibitory connections. Inputs are modified by a weight and summed using a linear combination. An activation function may control the amplitude of the output. For example, an acceptable range of output is usually between 0 and 1, or it could be −1 and 1. In most cases, the ANN is an adaptive system that changes its structure based on external or internal information that flows through the network.

In more practical terms, the neural network 407 of FIG. 4B can be non-linear statistical data modeling or decision-making tools that can be used to model complex relationships between inputs and outputs or to find patterns in data. Thus, ANNs may be used for predictive modeling and adaptive control applications, while being trained via a dataset. Note that self-learning resulting from experience can occur within ANNs, which can derive conclusions from a complex and seemingly unrelated set of information. The utility of ANN models lies in the fact that they can be used to infer a function from observations and also to use it. Unsupervised neural networks can also be used to learn representations of the input that capture the salient characteristics of the input distribution, and more recently, deep learning algorithms, which can implicitly learn the distribution function of the observed data. Learning in the neural network 407 of FIG. 4B is particularly useful in applications where the complexity of the data 401 or task (e.g., application modernization) makes the design of such functions by hand or by human action impractical.

For the system 400, the ML/AI algorithms therein can include the one or more neural networks (e.g., the neural network 407 of FIG. 4B) that are divided generally according to tasks to which they are applied. These divisions can fall within one or more categories, for example, regression analysis, classification, novelty detection and sequential decision making, data processing, clustering, blind signal separation, and compression.

According to one or more embodiments, the neural network 407 of FIG. 4B can implement a long short-term memory neural network architecture, a convolutional neural network (CNN) architecture, or another neural network. The neural network 407 of FIG. 4B can be configurable with respect to a number of layers, a number of connections (e.g., encoder/decoder connections), a regularization technique (e.g., dropout), and an optimization feature.

Turning now the method 408 performed in the neural network 407 are shown according to one or more embodiments. The neural network 407 operates to support implementation of the ML/AI algorithms (e.g., as implemented by the software 315 of FIG. 3A) described herein. The neural network 407 can be implemented in hardware, for example the machine 402 and/or the hardware 405 of FIG. 4A.

In an example operation, the software 315 of FIG. 3A includes collecting the data 401 from the hardware 405. In the neural network 407, an input layer 410 is represented by a plurality of inputs (e.g., inputs 412 and 414 of FIG. 4B). With respect to block 420 of the method 408, the input layer 410 receives the inputs 412 and 414. The inputs 412 and 414 can include the data 401 in non-standardized form. For example, the collecting of the data 401 can be an aggregation of the data 401 into a dataset.

At block 425 of the method 408, the neural network 407 encodes the inputs 412 and 414 utilizing any portion of the data 401 (e.g., the dataset and predictions produced by the system 400) to produce a hidden coding. The hidden coding includes one or more intermediary data representations derived from the plurality of inputs. According to one or more embodiments, the hidden coding is generated by an element-wise activation function (e.g., a sigmoid function or a rectified linear unit) of the software 315 of FIG. 3A. As shown in FIG. 4B, the inputs 412 and 414 are provided to a hidden layer 430 depicted as including nodes 432, 434, 436, and 438. The neural network 407 performs the processing via the hidden layer 430 of the nodes 432, 434, 436, and 438 to exhibit complex global behavior, determined by the connections between the processing elements and element parameters. Thus, the transition between the input layer 410 and the hidden layer 430 can be considered an encoder stage that takes the inputs 412 and 414 and transfers it to a deep neural network (within layer 430) to learn some smaller representation of the input (e.g., a resulting the hidden coding). The deep neural network can be a CNN, a long short-term memory neural network, a fully connected neural network, or combination thereof.

This encoding provides a dimensionality reduction of the inputs 412 and 514. Dimensionality reduction is a process of reducing the number of random variables (of the inputs 412 and 414) under consideration by obtaining a set of principal variables. For instance, dimensionality reduction can be a feature extraction that transforms data (e.g., the inputs 412 and 414) from a high-dimensional space (e.g., more than 10 dimensions) to a lower-dimensional space (e.g., 2-3 dimensions). The technical effects and benefits of dimensionality reduction include reducing time and storage space requirements for the data 401, improving visualization of the data 401, and improving parameter interpretation for ML. This data transformation can be linear or nonlinear. The operations of receiving (block 420) and encoding (block 425) can be considered a data preparation portion of the multi-step data manipulation by the software 315 of FIG. 3A. At block 445 of the method 408, the neural network 407 decodes the hidden coding. The decoding stage takes the encoder output and attempts to reconstruct some form of the inputs 412 and 414 using another deep neural network. In this regard, the nodes 432, 434, 436, and 438 are combined to produce in the output layer 450 an output 452, as shown in block 460 of the method 408. That is, the output layer 450 reconstructs the inputs 412 and 414 on a reduced dimension but without the signal interferences, signal artifacts, and signal noise. Examples of the output 452 include cleaned data (e.g., standardized clean/denoised version of the data 401).

Figure 5:
FIG. 5 illustrates an example architecture according to one or more embodiments.

FIG. 5 illustrates example architecture 500 according to one or more embodiments. The example architecture 500 can be considered an embodiment of the system 100 of FIG. 1. The example architecture 500 includes an engine 501 (e.g., the software 315 of FIG. 3 or the application modernization engine 101 of FIG. 1).

The engine 501 operates across one or more layers (as shown and/or as described herein) to provide an application modernization platform that accelerates application development and infrastructure renewal. The application development, as well as AI-assisted development capabilities of the engine 501, provide simulated intelligence and expanded tooling and systems work quickly and with improved results. Further, the engine 501 can provide out-of-band (OOB) audit and tracing, as well as OOB industry-standard security designed around zero-trust principle. Thus, the engine 501 and the example architecture 500 include an end-to-end modernization platform that provides at least legacy integration, process orchestration, and application development.

The one or more layers includes a data source layer 503, a unified integration layer 505, an AI core layer 507, a backend layer 508, and an application layer 509. According to one or more embodiments, the example architecture 500 can include an experience layer that provides a set of libraries (e.g., for Web, Angular, native iOS and native Android applications) that can be included in new or existing front-facing, customer, or client applications.

The data source layer 503 includes legacy systems, data, UIs, and GUIs, as represented by an existing system 511 and a third party application 512.

The unified integration layer 505 can include an integration designer 518 and one or more connectors 520 (e.g., FlowX.AI connectors). Byway of example, the one or more connectors 520 can include a first connector 521, a second connector 522, and an integration service 523. The unified integration layer 505 (e.g., a Kafka layer) can also include one or more queues 527 (e.g., a Kafka queue) and one or more plugins 530 (e.g., FlowX.AI plugins). By way of example, the one or more plugins 530 can include task management 531, a notification plugin 532, a document plugin 533, a reporting plugin 534, OCR plugin 535, and other plugins 536 (e.g., a risk control plugin).

The AI core layer 507 includes an agent pool 540 including one or more AI agents (e.g., FlowX.AI Agents). The one or more AI agents are specific tools for modernization. An AI agent of the agent pool 540 (as described herein) is a software program acting on behalf of another program or a user. Operationally, the one or more AI agents interact with the example architecture 500 and the engine 501, gather information, and self-determine/perform tasks utilizing the information based on objectives. The objectives can be user determined or set by other programs. Each of the one or more AI agents can independently decide on one or more actions required for the objectives. Each of the one or more AI agents have well-defined scopes (e.g., for BPMN process generation, for user interface, etc.) and track inputs to outputs. Each of the one or more AI agents aim to bring powerful automation and insight capabilities to optimize business applications, processes, and interactions. Each of the one or more AI agents are built on a flexible, LLM-agnostic core that can adapt to various deployment options, including open-source models, private LLMs, and integration with public LLM providers. Each of the one or more AI agents are designed to ensure secure, on-premise functionality while maintaining flexibility in model choice. These one or more AI agents can evolve through various versions, with improvements and new features added over time. Each of the one or more AI Agents can further provide outputs specific to the engine 501 for integration directly into various areas of the example architecture 500 (e.g., development process, process designing, UI designing). For instance, the engine 501 can use multiple AI agents from the agent pool 540 in the development process.

General examples of the one or more AI agents can include, but are not limited to, one or more supervised modernization agents 541.1, one or more assisted modernization agents 541.2, and one or more autonomous modernization agents 541.3. A supervised modernization agent 541.1 provides managed operation and modification to achieve objectives, for example, directed or verified behavior by another program or a user to learn how to map inputs and outputs to minimize variance in predictions. An assisted modernization agent 541.1 provides a contemporaneous operation that engages other components, programs, or a user through communication and/or coordination to achieve objectives, for example, using AI to analyze interactions and provide recommendations that achieve a better customer experience. An autonomous modernization agent 541.1 provides independent operation and self-modification to achieve objectives, for example, task selection, prioritization, goal-directed behavior, decision-making without intervention by another program or a user.

By way of further example, the one or more AI agents (e.g., FlowX.AI Agents) can include, by are not limited to, an AI assistant agent 542, AI analyst agent 543, AI designer agent 544, AI developer agent 545, an AI inspector agent 546, a supervisor agent 547, and a strategist agent 548. Each AI agent 542-548 can be considered a more specific example of one or more AI agents 541 and specialized for a specific task. Other examples of the one or more AI agents represented by the agent pool 540 can includes an AI writer agent that can generate process documentation, an AI optimizer agent that can debug processes or suggest improvements, and an AI auditor agent that can audit and perform compliance checks. Anyone of the agents of the agent pool 540 can communicate and utilize an AI model 549 (e.g., an LLM).

The AI assistant agent 542 can enhance customer service and operational efficiency. The AI inspector agent 546 can perform application review. The supervisor agent 547 can facilitate efficient monitoring. The strategist agent 548 can facilitate application creation and development.

The AI analyst agent 543 can provide deep insights and analytics for better decision-making. The AI analyst agent 543 can convert text, images, or documents to business processes, as well as edit processes or logic. For example, a more specialized version of the AI analyst agent 543 can be the AI writer agent that generates technical documentation for a specific business process.

The AI designer agent 544 can enable the creation of intuitive and user-friendly interfaces. The AI designer agent 544 can convert text, images, or documents to application UI designs. The AI designer agent 544 can edit UIs, as well as giving a UI, obtaining a UI, and mapping business data model on UI elements.

The AI developer agent 545 can facilitate rapid, secure, and efficient application development. For example, the AI developer agent 545 can include or access definitions to develop and deploy one or more applications on behalf of the engine 501. The AI developer agent 545 can convert text, or documents to business logic into business processes (in the form of business rules, conditions, validations) and to enhance application UI designs.

The backend layer 508 provides, with the engine 501, one or more core extensions 550 (e.g., FlowX.AI core extensions). Each of the one or more core extensions 550 can enhance and provide import/export functionality, as well as provide management automation wraps installers, executables, and scripts, for the example architecture 500 and the engine 501. By way of example, the one or more core extensions 550 can include a license manager extension 551, a scheduler extension 552, a content management system extension 553, an event gateway extension 554, an audit extension 555, data search extension 556, and other extensions. The backend layer 508 provides, with the engine 501, administrative software 558 and advanced controlling 559.

The application layer 509 includes an authentication and authorization system 570 and an application development environment 575. The application development environment 575 can include an integration designer 577, a process designer 579, and one or more software development kits (SDKs) 580 (e.g., FlowX.AI SDKs). The process designer 579 can be a 2.0 compliant process designer that acts as a source of truth and source code for any application of the customer or the engine 501. The one or more software development kits (SDKs) 580 can include, but are not limited to, an Android SDK 581, an iOS SDK 582, and an Angular SDK 583. The application development environment 575 can include extensible designer capabilities for UIs that uses both predefined engine components and custom components.

According to one or more embodiments, communications can occur throughout the example architecture 500 with one or more particular example communications being representative but not limiting. The arrows 591 indicate one or more server side communications. The arrows 592 indicate one or more server side communications (e.g., using REST/HTTP). The arrows 593 indicate one or more event queue communications (e.g., using Kafka). The arrows 594 indicate one or more authentication communications (e.g., using OpenID). The arrows 595 indicate one or more API protocol communications. Further, components of the AI core layer 507 and/or the agent pool 540 can use software frameworks to facilitate the integration of the AI model 549 (e.g., LangChain and Chroma). Further, the software frameworks can provide AI application databases, embeddings, vector searches, document storage, full-text searches, metadata filtering, and multi-modal operations. Anyone of the components of the backend layer 508 and/or the one or more core extensions 550 can use other software frameworks to facilitate backend operations. Further, the software frameworks can provide source-available, cross-platform, document-oriented database programs; in-memory database programs that store data as key-value pairs; distributed, multitenant-capable full-text search engines with an HTTP web interface and schema-free JSON documents; relational database management systems emphasizing extensibility and SQL compliance; and object storage systems working with unstructured data such (e.g., mongoDB, Redis, Elasticsearch, PostgreSQL/Oracle, and S3/MinIO). By way of example, the task management 531 and the document plugin 533 can integrate public HTTP, administrative HTTP, mongoDB, Redis, PostgreSQL/Oracle, and S3/MinIO. Further, the notification plugin 532 can integrate administrative HTTP, mongoDB, and Redis. The reporting plugin 534 can integrate public HTTP, administrative HTTP, and PostgreSQL/Oracle. The OCR plugin 535 can integrate S3/MinIO. The license manager extension 551 can extend capabilities and access to administrative HTTP, Redis, and PostgreSQL/Oracle. The scheduler extension 552 can extend capabilities and access to mongoDB. The content management system extension 553 can extend capabilities and access to public HTTP, administrative HTTP, mongoDB, Redis, and S3/MinIO. The event gateway extension 554 can extend capabilities and access to Redis. The audit extension 555 can extend capabilities and access to administrative HTTP and Elasticsearch. The data search extension 556 can extend capabilities and access to Elasticsearch. The administrative software 558 can extend capabilities and access to administrative HTTP, Redis, Elasticsearch, and PostgreSQL/Oracle. The engine 501 can extend capabilities and access to public HTTP, Redis, Elasticsearch, and PostgreSQL/Oracle. The advanced controlling 559 can extend capabilities and access to PostgreSQL/Oracle. Further, the application layer 509 can include scripting (e.g., utilizing JavaScript embedded therein). Furthermore, any change request can be implemented in the application layer 509 and is instantly deployed (e.g., by refresh) on all channels (e.g., Web, iOS, Android, Angular, etc.).

The engine 501 and the example architecture 500 provide application development via the application layer 509 and/or AI-assisted development via the AI core layer 507 that improves software and product team experiences (e.g., a developer, an information technology manager, a business analyst, or a quality confirmation (QA) engineer).

The engine 501 and the example architecture 500 provide legacy systems handling via the data source layer 503. Because approximately eighty percent (~80%) of information technology budgets are directed to maintaining legacy systems (e.g., existing system 511 and the third party application 512), enterprise customers face an urgent need to modernize and demand fast integrations with simplified, lower cost implementations. The engine 501 and the example architecture 500 provides modernization and fast integrations with simplified, lower cost implementations for the legacy systems (e.g., existing system 511 and the third party application 512).

The engine 501 and the example architecture 500 provide digital product development. Because of business competition, a need to secure market share, and a desire to keep pace with company growing, enterprise customers face an urgent need to build complex omnichannel digital products that provide excellent user experience (e.g., real time omnichannel is provided through a single process instance with all actors being synchronous and with accommodating real time field entry). The engine 501 and the example architecture 500 provides complex omnichannel digital products with excellent user experience.

The engine 501 and the example architecture 500 provide openness and flexibility. While software and product team experiences are conventionally locked into proprietary programming languages with compounding vendor fees and add-ons, the engine 501 and the example architecture 500 provides enterprise customers with a freedom to build and extend the existing enterprise computer systems (e.g., the legacy systems). According to one or more embodiments, the engine 501 and the example architecture 500 provide enterprise robustness for scalability, security, and elasticity. In this regard, the engine 501 and the example architecture 500 can provide a unified robust enterprise platform that is future-proofed.

The engine 501 and the example architecture 500 prove an open platform with no-code and full-code operations so that enterprise customers can bring any function for application development. For example, no-code capability enables the engine 501 to create application software through GUIs and configurations (e.g., BPMN tools of the process designer 579). Further, the BPMN tools provide a visual way in which multiple actions are orchestrated, from UI experiences/interactions, asynchronous tasks, integration with external systems, real time omnichannel collaboration, a dynamic data model, and single source of truth per workflow. For example, full-code capability enables the engine 501 to extend platform capabilities through custom components. For instance, a business process can be developed by the no-code operations, while full-code operations can develop a custom component with simple functionality (e.g., showing an animation) or more complex features that require routing (e.g., very complex designs, etc.). One or more advantages, technical effects, and/or benefits of the full-code capability include not using no proprietary language so that users can use existing scripting languages to perform complex business logic.

The engine 501 and the example architecture 500 provide interaction management of the one or more AI agents of the agent pool 540 to update, integrate, and service the components of the data source layer 503. Generally, interaction management of the engine 501 is software code that streamlines communication, improves interactions, and resolves conflicts between the one or more AI agents for development process, process designing, and UI designing. Further, interaction management of the engine 501 can include data collection and storage operations, analytics to identify data patterns, integration operations, and tracking operations. Interaction management can be implemented by the engine 501 and the example architecture 500 within palettes, chats, and user interfaces. For example, the AI agent can interact with the user via a command palette. The command palette is a UI element for interaction management that provides access to one or more commands and includes a free-form input field that the engine 501 receive inputs that identify an action (e.g., by narrowing down a list, based on type). Further, the interaction management of the engine 501 can enable the AI agent to interact with the user via a chat with follow-ups with respect to, as well as provide supervision, assistance, and feedback of the AI agent interactions.

According to one or more embodiments, the interaction management software code of the engine 501 includes document intelligence sub-system. Generally, the document intelligence sub-system is an automated data processing service that uses AI and OCR to quickly extract text and structure from documents. More particularly, the document intelligence sub-system enables uploading, processing, and managing contextual documents used by the one or more AI agents of the agent pool 540 to extract specific information defined by the user (e.g. extract only the value from uploaded invoice). For instance, the document intelligence sub-system can ingest user specific documentation ready to be used by the one or more AI agents of the agent pool 540. Further, the document intelligence sub-system can document classification and feature extraction for various agents.

The engine 501 and the example architecture 500 provide an observatory of the one or more AI agents of the agent pool 540. Generally, the observatory is a logging sub-system or a logging sub-layer for monitoring performance and efficiency of the one or more AI agents of the agent pool 540. Further, the observatory executes operations including observing and grading agent performance to improve/innovate monitoring of the one or more AI agents of the agent pool 540. Observing and grading agent performance can include receiving by the engine 501 through the observatory agent reporting upon completion. Improving/innovating the monitoring of the one or more AI agents of the agent pool 540 by the engine 501 through the observatory includes providing succinct information that is advantageous compared to conventional software development.

The engine 501 and the example architecture 500 can include a containerized micro-services architecture (e.g., container application) that provides the improved user experience over or layer on the existing enterprise computer systems (e.g., the legacy systems of the data source layer 503). The engine 501 and the example architecture 500 can pull from one or more different systems (e.g., six (6) different microsections of pages loading) until data is ready for integration. The engine 501 and the example architecture 500 can provide a core revival by deploying on top of (e.g., build a wrapper) existing the existing enterprise computer systems (e.g., the legacy systems of the data source layer 503) and build a new platform from a front end point of view while using customer data (e.g., the data 317 as shown in FIG. 3).

The engine 501 and the example architecture 500 can include SKD approach that enables zero-redeploy capabilities within the application development environment 575. For example, the engine 501 and the example architecture 500 can store and retrieve data (e.g., as well as use the data to map legacy systems) and metadata, and then interpret that the data and the metadata to generate UIs and GUIs during runtime. Further, the engine 501 and the example architecture 500 can update the data and the metadata without re-deploy, because the engine 501 and the example architecture 500 can change the source code. Thus, the engine 501 and the example architecture 500 can adapt to regulatory changes and/or other requirements while consumer applications are running.

The engine 501 and the example architecture 500 drives highly differentiated results by connecting fast to any legacy systems 510, mainframe, databases, APIs, filesystems, robotic process automations, any custom integration and other systems via the one or more queues 527 (e.g., a Kafka queue), thereby creating unified omnichannel native UIs while allowing and orchestrating custom full-code components. The custom full-code components can be deployed on-premises, hybrid, and/or multi-cloud systems (e.g., as the engine 501 and the example architecture 500 are infrastructure agnostic, as well as cloud-agnostic for easy deployment or migration to different cloud platforms).

Turning to FIG. 6, a method 600 is depicted according to one or more embodiments. The method 600 is an application development process that is implemented by the AI developer agent 545 and/or the engine 501 of FIG. 5 (e.g., application development performed by the application modernization platform or the FlowX.AI software platform in the context of modernization), as well as the AI designer agent 544. The AI developer agent 545 and/or the engine 501 can utilize the application development environment 575 and other elements of the example architecture 500 to perform the application development process. The application development process can be performed with no-code and full-code operations to generate a new application. A new application developed by the AI developer agent 545 and/or the engine 501 can be a collection of resources and provides a set of outcomes. The set of outcomes are used to identify processes that are defined by no-code and full-code operations. The application development process can also include augmenting an existing application with new functionality. The AI developer agent 545 and/or the engine 501 of FIG. 5 provide version control across the collection of resources (i.e., all application components, internal resources, and external resources).

The method 600 begins at block 620, where the engine 501 determines functionality for an application. The determining of the functionality can include determining a collection of resources to support a functionality. The determining of the functionality can include determining a collection of resources to provide a set of outcomes within an existing enterprise computer system (e.g., within the existing system 511). For instance, the AI developer agent 545 and/or the engine 501 can analyze operations of a business process and automatically identify and associate functionality to those operations. Further, each functionality is assigned one or more resources by the AI developer agent 545 and/or the engine 501.

According to one or more embodiments, the AI developer agent 545 and/or the engine 501 can orchestrate custom components. The custom components can include custom code. The custom components can be orchestrated with validators and custom business rules. The custom components can be orchestrated when identifying and associating the functionality. The AI developer agent 545 and/or the engine 501 can utilize the application development environment 575 and elements therein to orchestrate custom components (e.g., in Angular, React, iOS, and Android) by determining when to render custom components, what data to provide to custom code of the custom components, and what actions the custom components can perform in return. Custom components can leverage modernization platform components for "core functionality", examples of which include auditing, storing and serving content (text, image, video, document), indexing and searching data, and scheduling delayed jobs (recurrent or single time jobs).

At block 630, the AI developer agent 545 and/or the engine 501 receive a collection of resources to support the functionality. Accordingly, in any application, the collection of resources work together to help users achieve the set of outcomes. The collection of resources can include, but are not limited to, application components, internal resources, and external resources. Examples of application components, internal resources, and external resources include processes, user interfaces (UI), templates, documents, images, configurations, plugins, integration configurations, data models, custom code, and other resources.

More particularly, the collection of resources can include one or more UI component types. Examples of the one or more UI component types include root components, basic components, form components, indicator components, navigation components, custom components collection components, and third-party components. Root components can serve as the foundation for structuring user interfaces. Basic components can include buttons, file uploads, images, typography, text, and links. Form components can include inputs, text areas, select dropdowns, checkboxes, radio buttons, switches, segmented buttons, sliders, and date pickers. Indicator components can be badges, banners, or liked message icons/counters. Navigation components can include navigation areas, pages, steppers, steps, and modal containers. Custom components can be added to a template configuration tree with a unique identifier and specified data from a process model. Custom components can be developed in a web application and referenced by a component identifier. In mobile SDKs (e.g., Android), custom components can be implemented using CustomComposableComponent or CustomViewComponent interfaces. Collection Components can function as versatile container elements that allow iteration through a list of elements and display according to specific configurations. Third-party components can include software components or libraries (e.g., not part of the engine 501 or the example architecture 500 of FIG. 5) but created by other companies or individuals. Third-party components can include databases, operating systems, user interface components, and task-specific libraries.

At block 640, the AI developer agent 545 and/or the engine 501 edits the collection of resources. During development of the application, one or more of the collection of resources can be created, imported, edited, and deleted. Further, the AI developer agent 545 and/or the engine 501 of FIG. 5 can edit the collection of resources based on version control by includes tracking changes made thereto. By way of example, in a test case management for application development, it is possible to edit the collection of resources by configuring multiple pairs of input data and assertions for each node, grouped together in test cases.

According to one or more embodiments, the engine 501 executes test cases using continuous integration and continuous deployment (CI/CD) pipelines during application development. CI/CD pipeline can be a series of steps that automate and enhance processes of delivering a new version of software (in some case with version control applied). CI/CD pipeline can initiate test cases in an integration runtime to verify if a build passes all tests. Additionally, all business rules can be validated through a code quality check. According to one or more embodiments, CI/CD pipeline can provide support throughout the lifecycle of application development. The lifecycle of application development includes discovery, design, development, testing, release, and maintenance. Thus, as conventional software development does not support modernization while offering a complete no-code and full-code approach across all layers (e.g., from runtime to content management), CI/CD pipeline of the engine 501 enables a no-code and full-code approach while reducing risks in such setups by running test cases and enabling automated deployments between environments without manual intervention, ensuring immutable builds.

Figure 7:
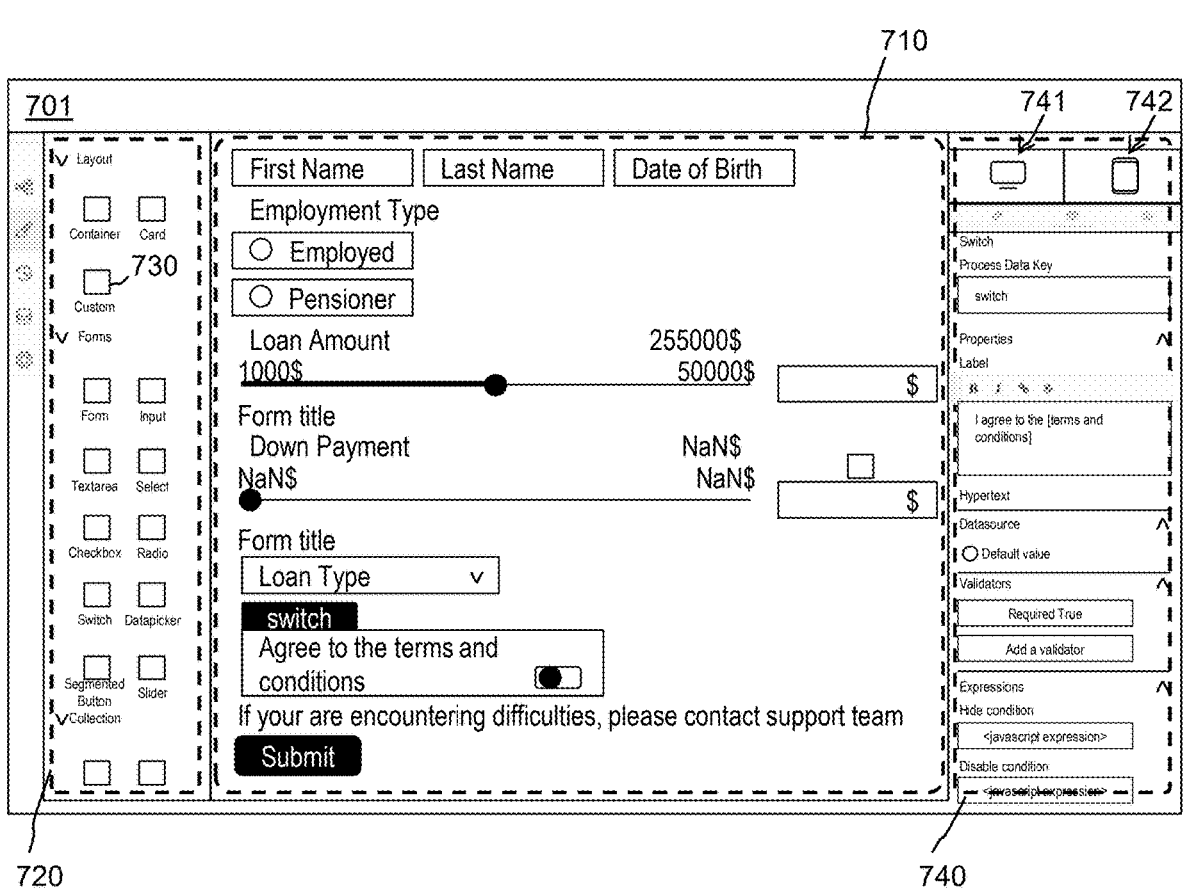
FIG. 7 illustrates a user interface according to one or more embodiments.

Turning to FIG. 7, a user interface 700 is illustrated according to one or more embodiments. The user interface 700 is used to generate a user interface 710 for a custom application, as an example of editing resources in the context of application development. The user interface 700 can be provided by the application modernization engine of FIG. 1 or as one of the one or more UIs or GUIs 316 of the software 315 of FIG. 3. The user interface 700 illustrates a technical effect, benefit, and advantage providing components 720 to a user so that the user does not need to write code for simple user interface elements of the custom application. The components 720 can include forms, inputs, text areas, selects, checkboxes, radios, switches, date pickers, segmented buttons, sliders, components collections, containers, cards, etc. By way of example, custom items (e.g., as depicted by element 730) can be used to build the custom application and the user interface 710. For instance, custom items can include animations (e.g., fireworks upon hitting the submit button), notification, etc. By way of further example, the application modernization engine herein can be practically applied to building a custom application. The user interface 710 and elements therein can be further configured through the parameters frame 740. Note the parameters frame 740 can toggle between multiple interface types (e.g., desktop 741 and mobile 742) so that different configurations can be applied to the user interface 710 based on the implementation.

In an example, the custom application can be a legacy application. Conventionally, a legacy application for receiving information at a scene of an automobile accident may exist where name and driver's license information can be entered through manual input. Yet, the legacy application does not allow for scanning of the driver's license itself or for drawing the scene (e.g., as required by Europe). The application modernization engine layers on top of the legacy application and generates a custom interface (e.g., which can be presented as the user interface 710 for the custom application). A user can drag and drop a scan interface element found under the components 720 to the user interface 710 so that the scanning of the driver's license feature can be added. Further, the element 730 can be used to add a drawing interface element so that a user can use their finger of a stylus to draw the scene. According to one or more embodiments, the user interface 700 illustrates that native apps can be generative, drag and drop operations can be used, and custom code can be written using the application modernization engine of FIG. 1 or as one of the one or more UIs or GUIs 316 of the software 315 of FIG. 3.

Figure 8:
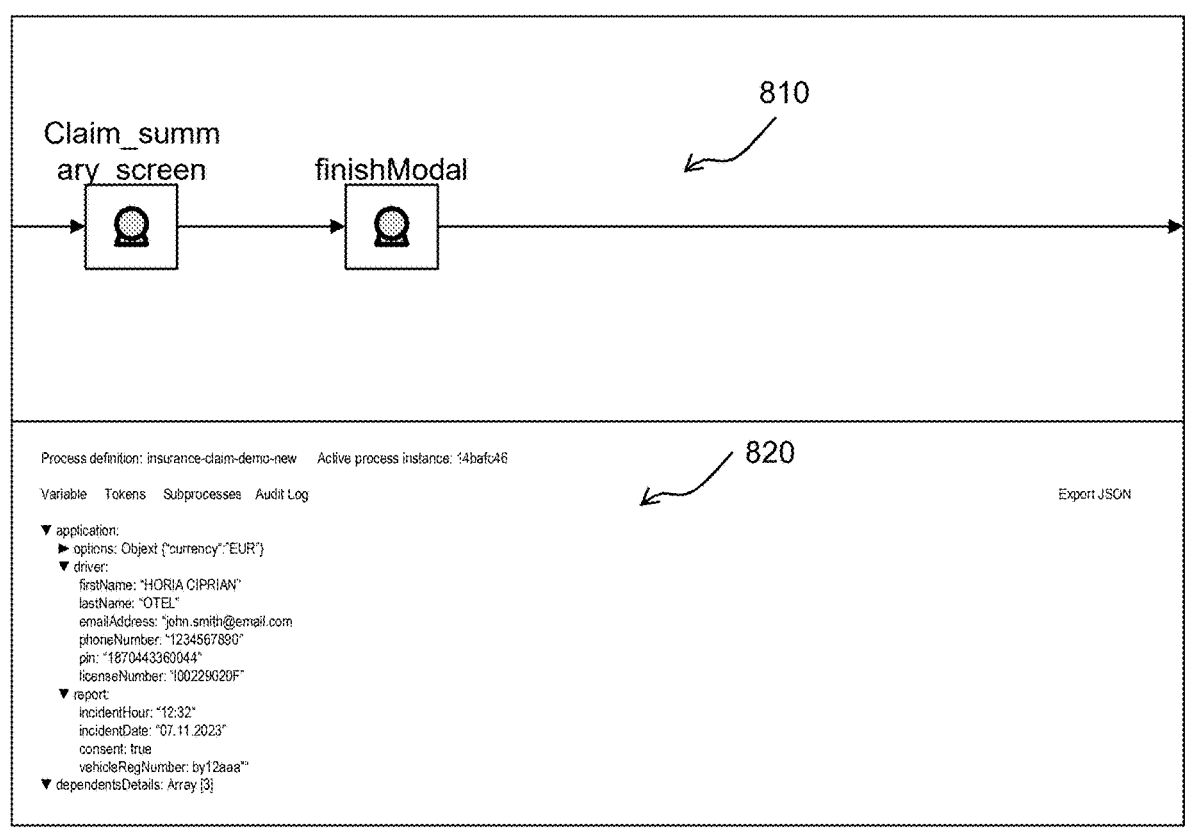
FIG. 8 illustrates a user interface according to one or more embodiments.

Returning to FIG. 6, at block 650, the AI developer agent 545 and/or the engine 501 develops the application for or on top of an existing enterprise computer system using no-code or full-code operations to integrate the collection of resources. More particularly, the engine 501 develops an application including the collection of resources with no-code and full-code operations. Turning to FIG. 8, a user interface 800 is illustrated according to one or more embodiments, where the user interface 800 shows BPMN model 810 representing a no-code operation and a JSON code 820 representing a full-code operation for application development. Note that the BPMN model 810 corresponds to the JSON code 820.

Figure 9:
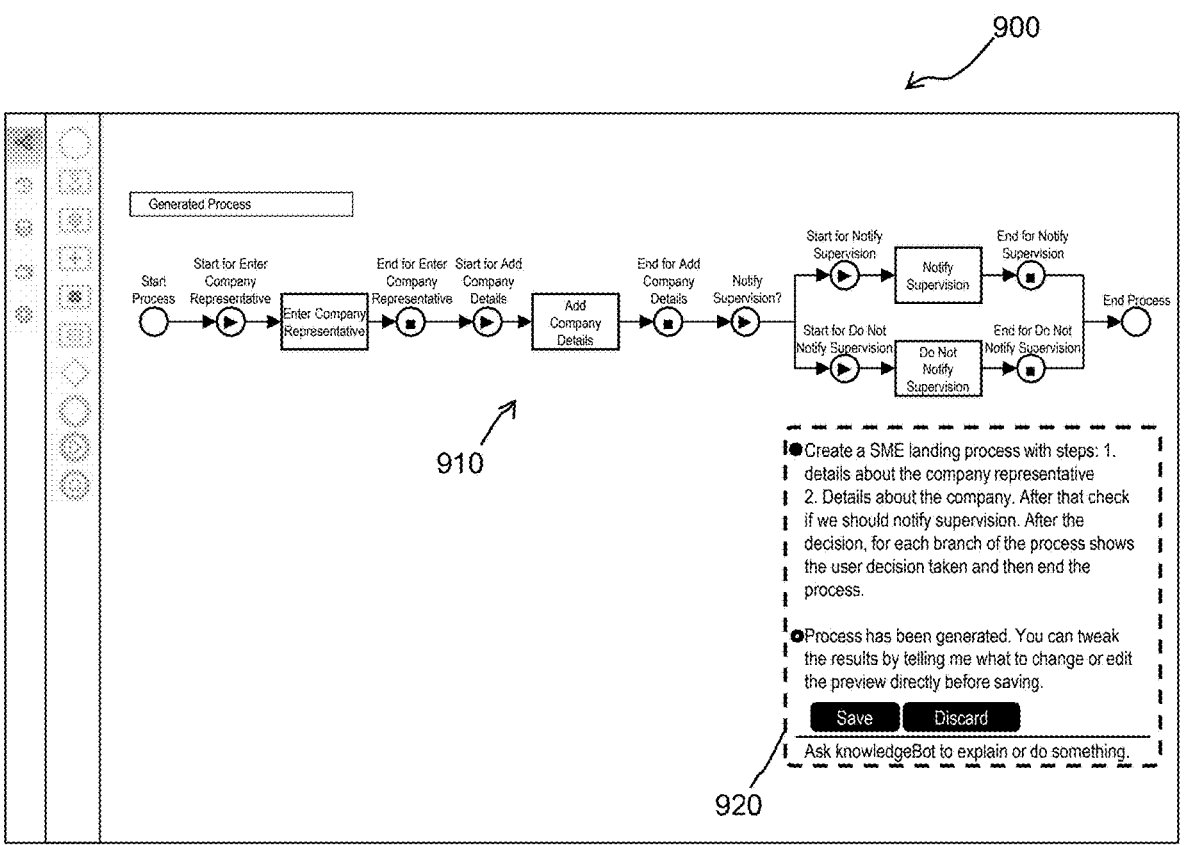
FIG. 9 illustrates a user interface according to one or more embodiments.

At block 660, the AI developer agent 545 and/or the engine 501 augments the application with new functionality. The new functionality is not present in the example architecture 500. Turning to FIG. 9, a user interface 900 is illustrated according to one or more embodiments. The user interface 900 is used to augment a BMPN model 910 based on natural language processing of user input in a window 920. The user interface 900 can be provided by the application modernization engine of FIG. 1 or as one of the one or more UIs or GUIs 316 of the software 315 of FIG. 3. According to one or more embodiments, the application modernization engine and/or ML/AI software thereof can provide an AI core (e.g., the system 100 of FIG. 1 or the AI core layer 507 of FIG. 5) with an ability to make decisions based on user input, as well as operate within certain parameters. The ML/AI software receives the user input in the window 920. The user input can be a natural language statement (e.g., whether typed, transcribed, or recorded). The user input can describe in natural language what a business process is and additional information for that business process. The application modernization engine and/or ML/AI software therefore process the user input to augment the BMPN model 910, which models the business process and the additional information. Note that the business process and the additional information can indicate a new functionality. Additionally, the user can provide further inputs in the window 920 or manually interact with the user interface 900 to augment the BMPN model 910. Once the BMPN model 910 is confirmed, the application modernization engine and/or ML/AI software thereof can generate a custom application and one or more corresponding UIs or GUIs based on the BMPN model 910.

Returning to FIG. 6, at block 670 the AI developer agent 545 and/or the engine 501 deploys the application into the existing enterprise computer system. Accordingly to one or more technical effects, benefits, and advantages, the application modernization engine provides the improved application development results through the simulated intelligence and the expanded tooling with improved design speed for the second functionality and providing faster deployment of the application. The AI developer agent 545 and/or the engine 501 can provide unified and versioned deployment of all application resources with zero downtime. Versioned deployment includes stepwise implementations of a software that includes improved/greater functionality per version. Application versioning synchronization can include initializing a new repository in an existing directory or by cloning an existing repository for saving and accessing versions of the application development project. By way of example, two teams working in parallel on different features of the same application (e.g., adding a KYC subprocess in the onboarding process and a 360-degree profile subprocess in the delegate management step) may modify the same metadata, such as the name of a node. When a first team merges updates into a master branch, everything functions as expected. However, when a second team attempts to merge updates into the same master branch, the engine 501 detects that the same metadata was modified compared to a common ancestor. The engine 501 will then display a view showcasing the two versions, allowing conflict resolution between the two versions.

At block 680, the engine 501 monitors the application for further versioning or conflict resolution. For example, the engine 501 permits application versioning synchronization with Git. A Git can include a local Git repository, which is further defined as a virtual storage of an application development project for saving and accessing versions of code. Also, for example, the engine 501 permits no-code and full-code merge conflict resolution where the engine 501 displays a view showcasing BMPN versions of the conflict across the two versions.

Figure 10:
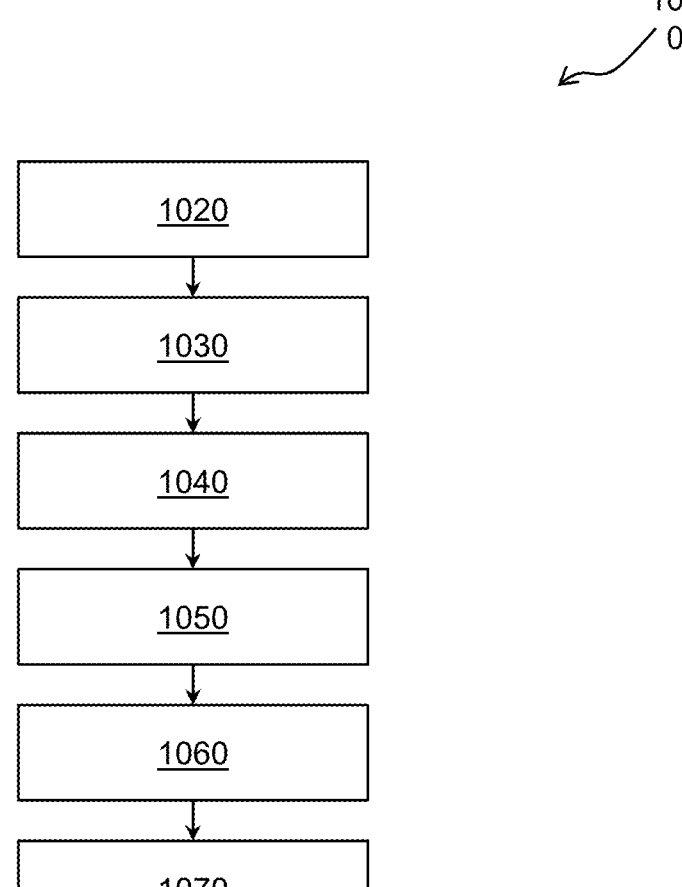
FIG. 10 illustrates a method according to one or more embodiments.

Turning now to FIG. 10, a method 1000 (e.g., performed by the system 100 of FIG. 1 or the software 315) is illustrated according to one or more embodiments. The method 1000 begins at block 1020, where the application modernization engine connects to the existing enterprise computer systems of a company (e.g., which containerizes an existing application). By connecting to the one or more existing enterprise computer systems, the application modernization engine is laying on top of the existing application and relative databases. That is, an existing application of the existing enterprise computer systems can be referred to as a container application of the application modernization engine. Operations of the container application can be expressed in a BMNP model generated by the application modernization engine.

At block 1030, the application modernization engine presents the container application in a user interface. The application modernization engine does not delay the presentation of the user interface, as different aspects of the container application may take time to load. This improves user experience with the application modernization engine, compared to conventional use of the container application.

Figure 11:
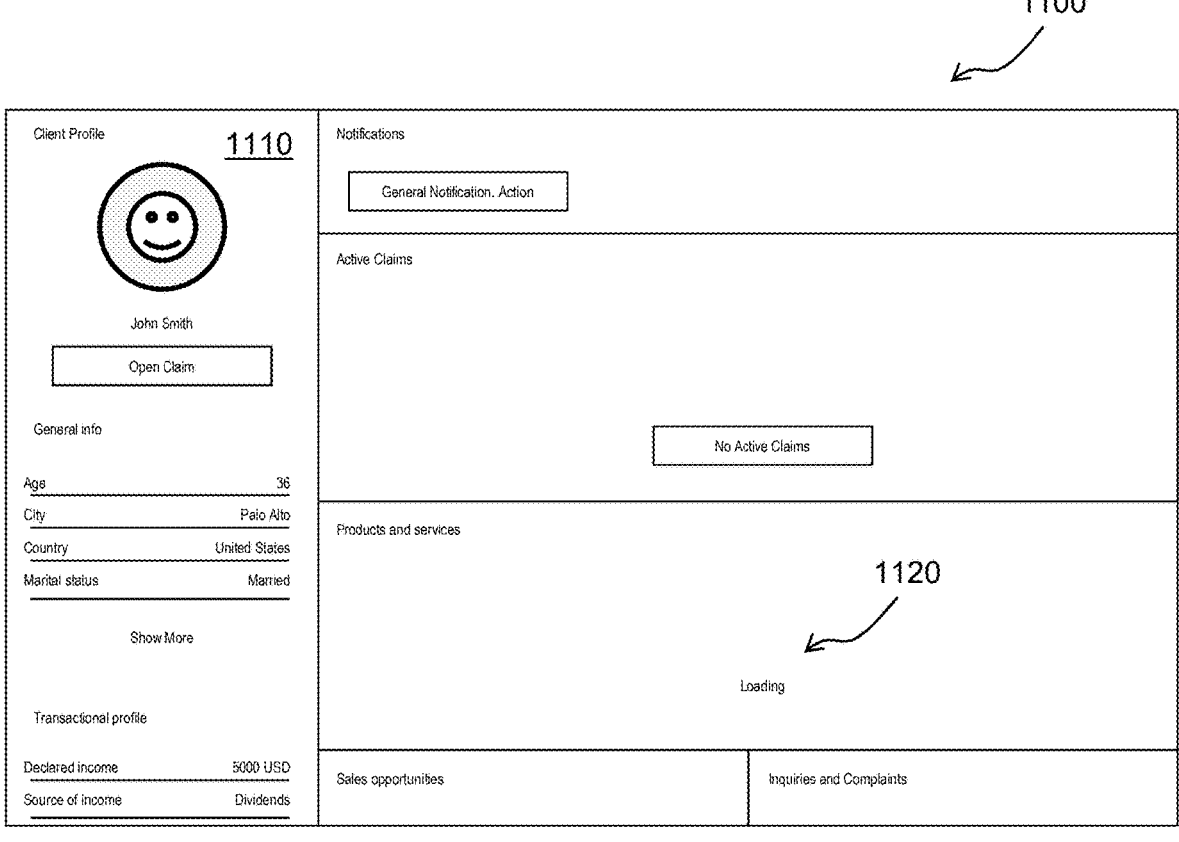
FIG. 11 illustrates a user interface according to one or more embodiments.

Turning to FIG. 11, a user interface 1100 is illustrated according to one or more embodiments, where the user interface 1100 shows loaded data 1110 and a loading frame 1120. For example, the company has the existing application (e.g., the container application) and six (6) different databases with customer information. The application modernization engine populates individual portions of the user interface 1100 as data is ready (e.g., is received from the six (6) different databases and processed by the application modernization engine). Thus, once the data is ready, the data is pushed to the user experience for the existing application (e.g., the application modernization engine presents the container application in a user interface).

Returning now to FIG. 10, at block 1040, the application modernization engine dynamically revives the existing application. In this regard, the application modernization engine builds modern digital products on top of the existing application by manipulating the BMNP model generated by the application modernization engine.

Figure 12:
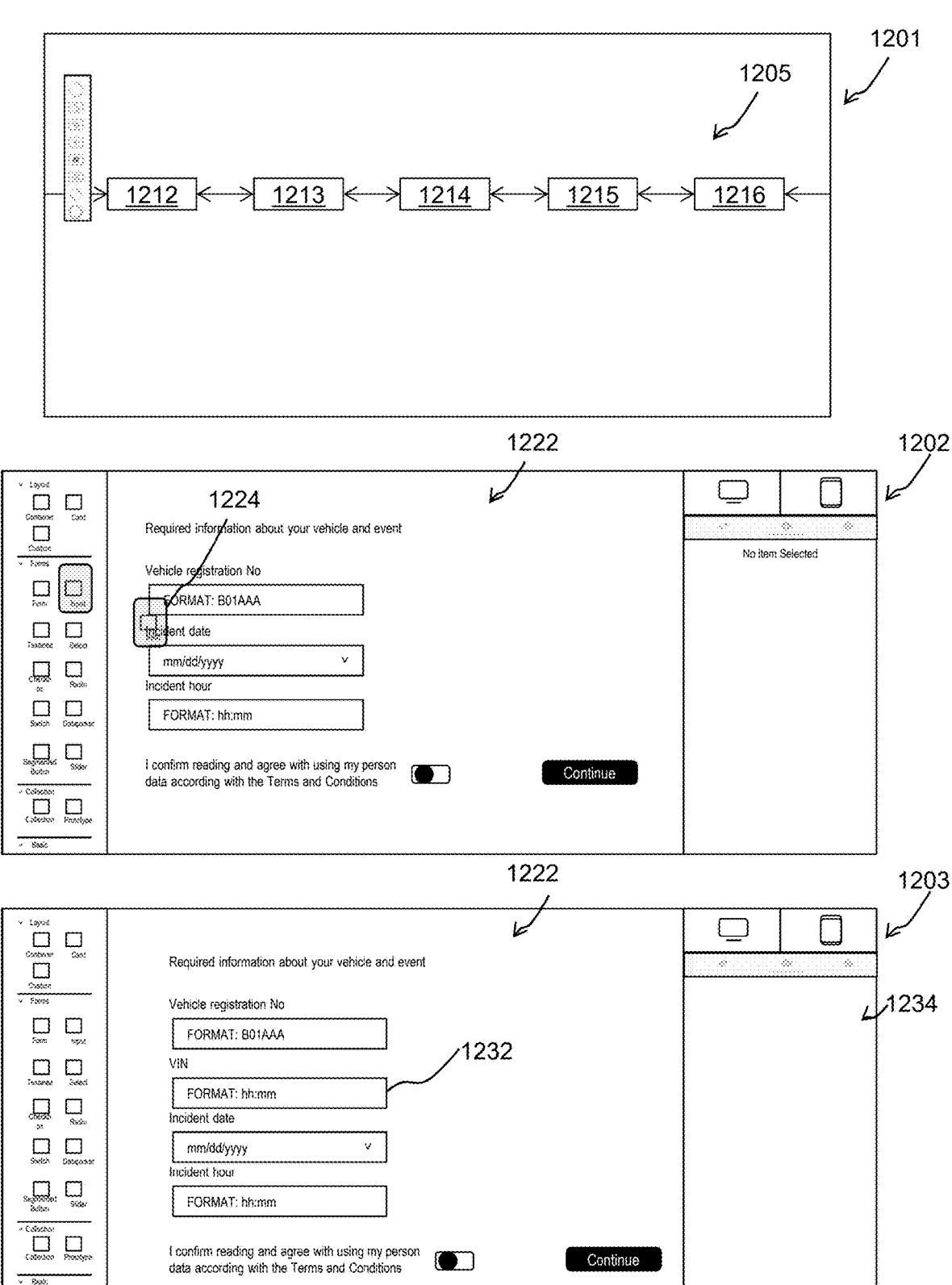
FIG. 12 illustrates user interfaces according to one or more embodiments.

Turning to FIG. 12, user interfaces 1201, 1202, and 1203 are illustrated according to one or more embodiments. The user interface 1201 shows a BMNP model 1205, with a plurality of nodes 1212, 1213, 1214, 1215, and 1216. For example, the node 1212 can represent a step of the container application where an email check is performed. The node 1213 can represent a step of the container application where a landing interface is presented. The node 1214 can represent a step of the container application where information is required from the user. The nodes 1215 and 1216 can represent additional step of the container application.

The user interfaces 1202 and 1203 show no-code interface development of the BMNP model 1205. That is, the user interface 1202 shows an interface 1222 of the container application associated with the node 1214. Further, a drag and drop action provides a basic input element 1224 into the interface 1222. The user interface 1203 shows how the basic input element 1224 is updated to a VIN Number input element 1232 based on configuration entered into a configuration panel 1234. The configuration panel 1234 can receive configuration inputs including, but not limited to, container, layout, directions, justify, align, wrap, gap, sizing, spacing, shadow, background, color, border, radius, and width. Thus, by manipulating and saving the BMNP model 1205 and the interface 1222 in the user interfaces 1201, 1202, and 1203, the code and metadata are automatically updated for the container application. According to one or more embodiments, a key can be associated with the VIN Number input element 1232 in the configuration panel 1234 so that all data can be mapped within the application modernization engine and to the existing enterprise computer systems. In this regard, the key is to retrieve values stored, as well as write data on any backend system. According to one or more embodiments, the application modernization engine enables copy and pasting of nodes, interface elements, keys, and other features to increase speed of the application development.

Returning now to FIG. 10, at block 1050, the application modernization engine provides a zero-redeploy operation. According to one or more embodiments, the container application is refreshed, which pulls all updates made to the existing application (e.g., revivals of the code and metadata of the container application). In this way, the application modernization engine provides a technical effect and benefit of a new container application not needing to be re-deployed. For example, an iOS application takes many days for security approval from Apple to upload a new version of the iOS application. With zero-redeploy, rather than the new version, the application modernization engine generates user interfaces for the iOS application during runtime in a matter of seconds.

Returning now to FIG. 10, at block 1060, the application modernization engine dynamically augments the container application to include new capabilities (e.g., capabilities that existing applications do not have, for example an OCR).

According to one or more embodiments, the systems for and the methods by the application modernization platform described herein can provide omni-channel generative user experience (e.g., for mobile and web), no-code/full-code experience (e.g., for building and deploying any UI feature), real-time single-source-of-truth experience (e.g., for workflow orchestration), bring your own code experience (e.g., for an open platform architecture), and event-driven, containerized, scalable platform and asynchronous architecture experience. The omni-channel generative user experience can include operating both web and mobile interfaces at the same time. The no-code/full-code experience can include developing simple interfaces and applications from a business process using the no-code experience, while the full-code experience developing custom complex features (e.g., the no-code/full-code experience is in contrast to and an improvement on no-code/low-code experiences). The real-time single-source-of-truth experience can include synchronizing all actors and data so no outdated data is used. The bring your own code experience enables users to bring any new functionality (e.g., not limited by the application modernization platform) that is orchestrated by the application modernization platform. The event-driven, containerized, scalable platform and asynchronous architecture experience can include masking legacy systems while providing new UIs and GUIs.

Turning now to FIG. 13, a method 1300 (e.g., performed by the system 100 of FIG. 1 and/or the example architecture 500 of FIG. 5) is illustrated according to one or more embodiments. The method 1300 is an example of an omnichannel process of the application modernization platform where simultaneous operation of multiple user interfaces is performed. Generally, the omnichannel runtime processes can be referred to as runtime. Runtime includes functions and components of the application modernization that are used during execution of an application (e.g., developed by the application modernization platform). Thus, the omnichannel process of the application modernization platform provides an omnichannel application, which is an application that operates across multiple platforms, for example, web and mobile (e.g., Android and/or iOS).

The method 1300 begins at block 1310, the application modernization platform provides services that run business logic defined in an independent omnichannel application. More particularly, the application modernization platform determines functionalities of an independent omnichannel application. The functionalities can be further defined in the UI area. The UI area provides a base system (e.g., generic, web, Android, iOS, and other operating systems and platforms) specific navigation areas. The application modernization platform can place the UI area in a "navigation context". The UI area can include theming (e.g., omnichannel low-code theming of the UI) across multiple channels (e.g., web and/or mobile). Interface theming is a customizing of UIs to reflect a brand's visual identity, stylistic elements, color, typography, spacing, etc.

According to one or more embodiments, runtime includes starting from a process augmented with UI definitions where the application modernization platform enables a determination of an entire execution flow that can be used by/as the independent omnichannel application or can be embedded into an existing application to enable the omnichannel runtime processes.

At block 1330, the application modernization platform provides a container SDK. A container SDK is a low-overhead package of creation tools facilitating application generation and modernizing existing applications. The creation tools include a compiler, debugger, software framework, user interface tools, networking layer, etc. The networking layer can provide for synchronizing application state across multiple channels. Channels, such as an iOS app or a web interface, allow seamless interaction. For example, a container application can refer to an existing application, such as a bank's mobile banking application. A mortgage application can be started at a branch, and then continued on a mobile phone or a web application. Accordingly, each time a button is pressed, all connected channels are updated in real-time. Further, when entering information at any location, a teller can see updates in real-time. The application modernization platform can leverage server-sent events (SSE) for network communication and Kafka for backend messaging.

At block 1350, the application modernization platform serves one or more resources to the container SDK. The one or more resources are used to modernize existing computer systems and container applications within the container SDK. The container SDK can be embedded into the application modernization platform, and upon receiving a trigger (e.g., pressing a button), the application modernization platform takes over rendering a screen with a flow built in the application modernization platform.

At block 1370, the application modernization platform integrates the container SDK into existing applications to display and interact with the functionalities defined in the independent omnichannel application. For instance, the application modernization engine integrates resources of a container software development kit to enable the functionalities with high availability and resilience to failure using an advancing controller component.

According to one or more embodiments, the advancing controller component is a support service for the application modernization platform that enhances the efficiency of advancing operations. The advancing controller component facilitates equal distribution and redistribution of the workload during scale-up and scale-down scenarios. The advancing controller component is responsible for managing and optimizing the advancement process in one or more databases (e.g., PostgreSQL or OracleDB databases). The advancing controller component ensures efficient workload distribution, performs cleanup tasks, and monitors the status of worker pods. If a worker pod fails, the advancing controller component reassigns work to other pods to prevent process instances from getting stuck.

According to one or more embodiments, the application modernization platform enables A/B testing for new versions of the execution flow with zero downtime. A/B testing compares two or more application design versions for best performance and can be embedded seamlessly into the application modernization platform to enable the applications container to be updated just by editing any part of the underlying process (e.g., the container SDK). The application modernization platform can also orchestrate native code existing in the host application. From the container SDK to the application modernization platform, actions are identified. From the application modernization platform to the container SDK, actions are also identified. In turn, all actions are asynchronous for best performance (e.g., within the algorithm/system design). The application modernization platform provides zero downtime redeployment of application changes. That is, with conventional redeployment a new version typically requires the server to restart to serve the updated version. However, runtime of the application modernization platform allows the application modernization platform to run a build, import a new version, and seamlessly switch between builds without any downtime.

At block 1390, the application modernization platform simultaneously drives two or more user interfaces of the independent omnichannel application based on the functionalities.

Asynchronous orchestration of execution flow runtime. For example, in a 360-degree profile view, a background process can asynchronously start multiple subprocesses to gather all the necessary data. Initially, the web interface can display minimal information, and as each subprocess completes and retrieves additional data (e.g., a list of transactions), the application modernization platform can push updates to the web application to dynamically add new sections.

Turning to FIG. 14, interfaces 1401 and 1402 are illustrated according to one or more embodiments. The interface 1401 shows a web interface, and interface 1402 shows a mobile interface. Both interfaces 1401 and 1402 are provided at the same time to a customer service user and a customer, respectively. The customer service user and the customer can be on a conference or a phone call. The customer service user directs the customer to scan 1422 a license, so that the application modernization engine can implement a new OCR capability. According to one or more embodiments, the application modernization engine enables copy and pasting of new capabilities and other features to increase speed of the application development. According to one or more embodiments, keys can be updated or changed to further map the augmentations within the application modernization engine and to the existing enterprise computer systems, so that database updates are automatic.

Figure 15:
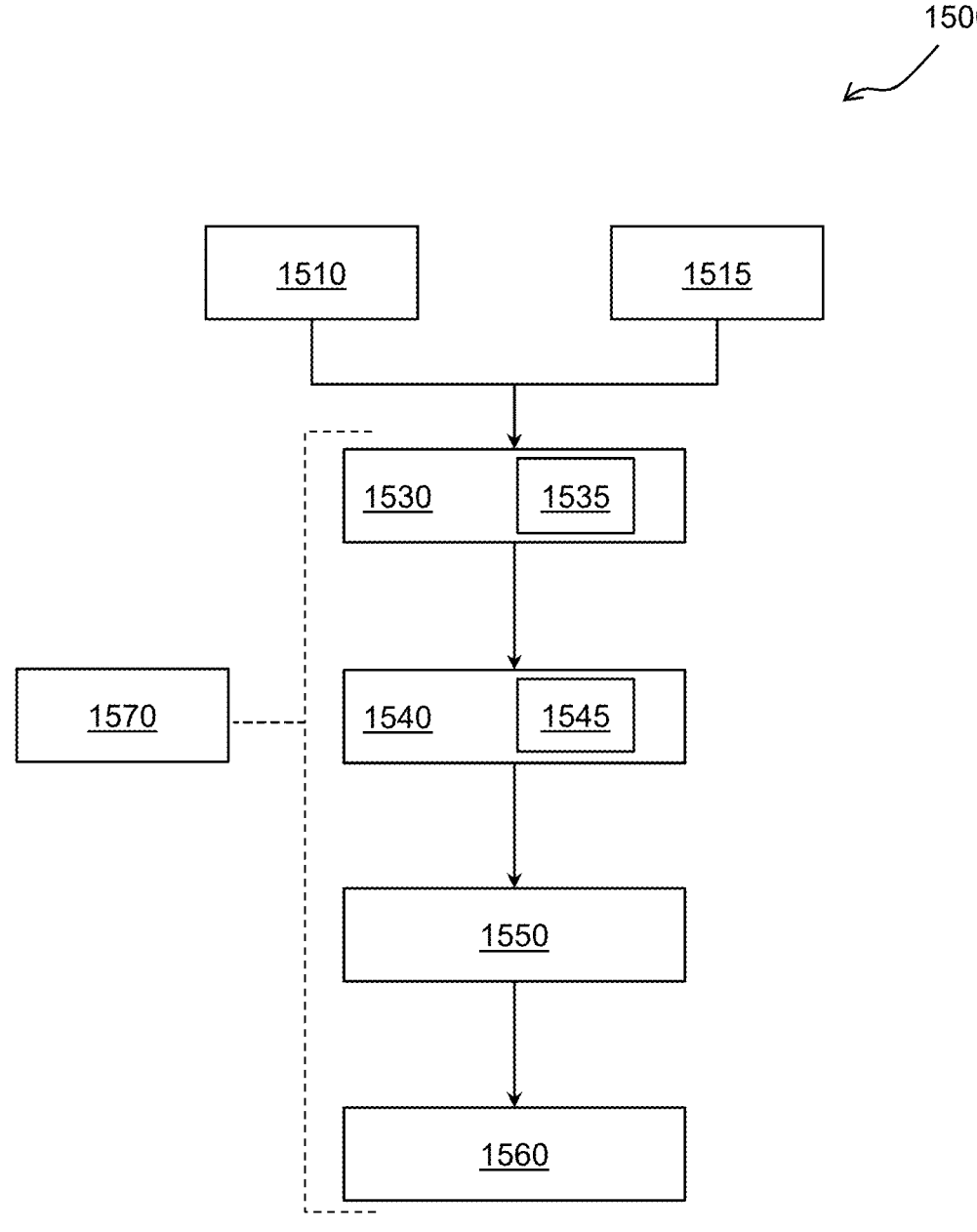
FIG. 15 illustrates a method according to one or more embodiments.

Turning to FIG. 15, a method 1500 is depicted according to one or more embodiments. The method 1500 can be performed by the system 100 of FIG. 1 and/or the example architecture 500 of FIG. 5. For ease of explanation, the method 1500 is described with respect to FIG. 5 as applicable.

According to one or more embodiments, the example architecture 500 performs the method 1500 to provide the one or more AI agents of the agent pool 540 and interaction management of the one or more AI agents to update, integrate, and service the legacy systems, the data, the UIs, and the GUIs of the data source layer 503. Further, the example architecture 500 performs the method 1500 to enable the one or more AI agents with an ability to provide modern, seamless, zero-friction digital integration processes on top of the legacy systems, the data, the UIs, and the GUIs, that are easy and satisfying to operate, and assist the companies in achieving individual tasks and discrete business objectives without encumbering the users. Additionally, the example architecture 500 performs the method 1500 to enable the interaction management of the one or more AI agents of the agent pool 540 so companies can implement security, scalability, flexibility, lack of friction, and high availability while modernizing and/or integrating the legacy systems, the data, the UIs, and the GUIs.

The method 1500 begins at block 1510, the example architecture 500 receives the data of the data source layer 503. According to one or more embodiments, the engine 501 receives the data and/or data generated by the one or more AI agents. In the context of application development, the one or more AI agents add and use multiple sources of context (e.g., images, documents, etc.), along with user interactions with the example architecture 500, to receive the data. The multiple sources of context can be used across all AI agents of the agent pool 540 enabling consistency across AI agent outputs. The multiple sources of context, and any received data, can pass between the AI agents of the agent pool 540 within memory or other storage unit accessible by the example architecture 500. The database memory or other storage unit can store definitions of processes and screens to be a single source of truth for the context for all AI agents of the agent pool 540.

At block 1515, the example architecture 500 can receive one or more objectives. The one or more objectives can be based on user input, as well as define certain parameters. The one or more objectives (i.e., the user input) can be a natural language statement (e.g., whether typed, transcribed, or recorded) or description of a business process and additional information for that business process.

According to one or more embodiments, the one or more AI agents of the agent pool 540 within the example architecture 500 receives the data and the one or more objectives. By way of another embodiment, the document intelligence sub-system of the interaction management of the engine 501 receives the data of the data source layer 503. and/or data generated by the one or more AI agents. More particularly, the document intelligence sub-system enables uploading of contextual documents used by the one or more AI agents of the agent pool 540. Further, the interaction management of the engine 501 receives the one or more objectives.

At block 1530, the example architecture 500 processes at least the data. The one or more AI agents of the agent pool 540 can process at least the data. Further, the example architecture 500 can process the data of the data source layer 503 and the one or more objectives. The document intelligence sub-system can also be used to process the data and the objectives.

According to one or more embodiments, processing the at least the data and the one or more objectives by the one or more AI agents aims to extract/identify text and structure. In some cases, the document intelligence sub-system uses AI and OCR to quickly extract text and structure from the data of the data source layer 503 and/or the one or more objectives. More particularly, the document intelligence sub-system enables processing of the contextual documents to extract specific information defined by the one or more objectives. For instance, at sub-block 1535, the document intelligence sub-system processes the data by extracting and ingesting specific contextual information to achieve document classification and feature extraction.

At block 1540, the example architecture 500 provides one or more processes on top of the data source layer 503. The one or more processes are provided according to the one or more objectives. That is, one or more processes are implemented on top of the legacy systems, the data, the UIs, and the GUIs of the data source layer 503 to achieve the one or more objectives. The one or more processes can be provided within a containerized application and/or UI. For instance, at sub-block 1540, the document intelligence sub-system provides the specific contextual information, the document classification, and the feature extraction to the one or more artificial intelligence agents to generate and implement one or more processes on top of the legacy systems, the data, the UIs, and the GUIs of the data source layer 503 to achieve the one or more objectives.

At block 1550, the example architecture 500 augments the data source layer 503. More particularly, the engine 501 implement one or more processes on top of the legacy systems, the data, the UIs, and the GUIs of the data source layer 503 to achieve the one or more objectives, where the one or more processes are outputs that augment the legacy systems, the data, the UIs, and the GUIs of the data source layer 503 with capabilities.

Accordingly to one or more embodiments, the example architecture 500 provides one or more supervised modernization agents 541.1, one or more assisted modernization agents 541.2, and one or more autonomous modernization agents 541.3 to augment the legacy systems, the data, the UIs, and the GUIs of the data source layer 503 with capabilities. The supervised modernization agents 541.1 provides managed processes and modifications for the data source layer 593 to achieve the one or more objectives. The assisted modernization agents 541.1 provides contemporaneous processes that engage other components, programs, or a user through communication and/or coordination to achieve the one or more objectives. The one or more autonomous modernization agents 541.1 provides independent processes and self-modification to achieve the one or more objectives.

At block 1560, the observatory monitors the one or more AI agents of the agent pool 540. The observatory monitors performance and efficiency of the one or more AI agents of the agent pool 540. Further, the observatory executes operations including observing and grading agent performance to improve/innovate monitoring of the one or more AI agents of the agent pool 540.

At block 1570, the example architecture provides fine-tuning of existing models utilized by the one or more AI agents. Fine-tuning can learn from and utilize the results of the blocks 1530, 1540, 1550, and 1560. Further, fine-tuning by the example architecture 500 or the engine 501 includes utilizing synthetic data generation to provide a pipeline of new data to fine-tune existing models (e.g., existing LLMs) to better suit the modernization needs (e.g. models specialized for BPMN process generation, etc.). Synthetic data is data generated by the engine 501 using LLMs that mimics real data for a particular task.

According to one or more embodiments, fine-tuning can include generated data pairs (e.g., query and response), fine-tune existing models using the data pair. More particularly, the engine 501 can generate data pairs tailored to a specific use case (e.g., process generation from textual prompt, etc.). Then, the engine 501 can use the generated data to fine-tune an existing model, and the fine-tuned model claims builds from the AI agents.

For example, synthetic data for AI analyst agent 543 (e.g., for a BPMN process generation) can have one or more pairs, for example, a query of a prompt that the user will input to the AI analyst agent 543 that describes the process and an expected output as a JSON representation of the process that needs to be generated based on the query. By way of example, the query could state "Generate me a process that has the following nodes . . . ". Note that while training procedures may be common, each fine-tuned model involves generating or acquiring specific data, annotating the specific data, then using an optimization algorithm to fine-tune a base model. The optimization algorithm is another tool of the engine 501 as described herein.

For example, the example architecture 500 can interact with the legacy systems, the data, the UIs, and the GUIs of the data source layer 503 and the interaction management of the one or more AI agents of the agent pool 540 can update, integrate, and service the components of the data source layer 503. The method 1500 can include solving problems between the agent pool 540 and the data source layer 503 (e.g., thereby enabling a multi-agent approach that otherwise would not be possible). As an end goal, the interaction management of the example architecture 500 supports supervised, assisted, or autonomous modernization agents that are implementing modernization of the data source layer 503. More particularly, interaction management can include agent orchestration, interaction with the AI agents, communication between the AI agents, AI agents suggesting improvements, and AI agents solving a problem. The one or more AI agents of the agent pool 540 can also use external resources (e.g., databases, etc.) for performing modernization. The one or more AI agents can identify an application description and work together to build the UIs, GUIs, and the logic code there behind. According to one or more embodiments, the interaction management of the example architecture 500 includes the multi-agent approach where a request is received within the example architecture 500, AI agent understands a context of the request, and communicates with another AI agent to provide feedback to the request. Further, the request can originate from anywhere in an application, and the engine 501 can understand the context so as to find a target agent. The target agent can then utilize one or more AI agents of the agent pool 540 to provide feedback in a targeted context. Thus, the example architecture 500 provides technical effects, advantages, and benefits of improved communication between multiple agents using context to directly answer request that is otherwise unavailable with conventional in-house proprietary integration software.

The technical effects, advantages, and benefits of the one or more AI agents of the agent pool 540, interaction management of the one or more AI agents, and the method 1500 herein include, but are not limited to, improved software productivity, reduced systems costs, informed determinations/predictions, and improved experience. Improved software productivity is achieved by delegation of repetitive tasks to the one or more AI agents of the agent pool 540. Reduced system costs are achieved by reducing or eliminating process inefficiencies, errors, and unnecessary manual processes, as well as improving memory usage and reducing process utilization by the example architecture 500 and the engine 501. Informed determinations/predictions are achieved by gathering and processing robust quantities of real-time data that a human is not capable of receiving and pondering on the same scale and time frame. Improved experience is achieved by proactively prompt responses, personalizing product recommendations, and improving user engagement and conversion.

According to one or more embodiments, a method implemented by an application modernization engine being executed by one or more processors is provided. The method includes connecting to existing enterprise computer systems and reviving the existing enterprise computer system by building digital products on top of the existing enterprise computer system. The method includes augmenting the existing enterprise computer system with capabilities.

According to one or more embodiments or any of the method embodiment herein, the application modernization engine can modernize the existing enterprise computer system by decommissioning a legacy system with no business discontinuity.

According to one or more embodiments or any of the method embodiments herein, the application modernization engine can modernize the existing enterprise computer system by building additional digital products on top of the existing enterprise computer system.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, for example, radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media (e.g., internal hard disks and removable disks), magneto-optical media, optical media (e.g., compact disks (CD) and digital versatile disks (DVDs)), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of application modernization engine executed by one or more processors, the application modernization engine providing an improved contextual document processing and specific information extraction, the method comprising:

receiving, by document intelligence sub-system of the application modernization engine, data of an enterprise computer system generated by one or more artificial intelligence agents;

processing, by the document intelligence sub-system, the data by extracting and ingesting specific contextual information to achieve document classification and feature extraction; and providing, by the document intelligence sub-system, the specific contextual information, the document classification, and the feature extraction to the one or more artificial intelligence agents to implement one or more processes on top of the enterprise computer system to achieve one or more objectives, wherein the application modernization engine comprises a multi-agent approach for an interaction management where a request is received with a context and two or more artificial intelligence agents of the one or more artificial intelligence agents communicate and provide feedback targeted to the context of the request to achieve the one or more objectives.

2. The method of claim 1, wherein the data of an existing enterprise computer system comprises multiple sources of context and user interactions to provide an initial enabling consistency across outputs.

3. The method of claim 1, wherein the document intelligence sub-system receives an upload of contextual documents as the data processed by the one or more artificial intelligence agents.

4. The method of claim 1, wherein the document intelligence sub-system utilizes artificial intelligence or optical character recognition to extract text and structure from the data of the enterprise computer system and identify the one or more objectives.

5. The method of claim 1, wherein the application modernization engine comprises an interaction management of the one or more artificial intelligence agents to modernize the enterprise computer system.

6. The method of claim 1, wherein the application modernization engine comprises an interaction management between two or more supervised, assisted, and autonomous modernization agents of the one or more artificial intelligence agents.

7. The method of claim 1, wherein the one or more artificial intelligence agents comprise two or more of a supervised agent, an assisted agent, and an autonomous modernization agents to implement the one or more processes and achieve the one or more objectives.

8. The method of claim 1, wherein the application modernization engine provides the improved contextual document processing and specific information extraction by implementing modernization of the enterprise computer system with agent orchestration, interaction, communication, and suggesting improvements via the one or more artificial intelligence agents.

9. The method of claim 1, wherein the application modernization engine implements the method during a runtime of the enterprise computer system over.

10. The method of claim 1, wherein the one or more artificial intelligence agents comprise a target agent identified by the context.

11. The method of claim 1, the multi-agent approach comprises using the context to directly answer the request.

12. A computer program product comprising program code of application modernization engine, the computer program code being stored on a non-transitory computer readable medium coupled to one or more processors, the computer program code being executable by the one or more processors, the application modernization engine providing an improved contextual document processing and specific information extraction by operations of the application modernization engine comprising:

receiving, by document intelligence sub-system of the application modernization engine, data of an enterprise computer system generated by one or more artificial intelligence agents;

processing, by the document intelligence sub-system, the data by extracting and ingesting specific contextual information to achieve document classification and feature extraction; and providing, by the document intelligence sub-system, the specific contextual information, the document classification, and the feature extraction to the one or more artificial intelligence agents to implement one or more processes on top of the enterprise computer system to achieve one or more objectives, wherein the application modernization engine comprises a multi-agent approach for an interaction management where a request is received with a context and two or more artificial intelligence agents of the one or more artificial intelligence agents communicate and provide feedback targeted to the context of the request to achieve the one or more objectives.

13. The computer program product of claim 12, wherein the data of an existing enterprise computer system comprises multiple sources of context and user interactions to provide an initial enabling consistency across outputs.

14. The computer program product of claim 12, wherein the document intelligence sub-system receives an upload of contextual documents as the data processed by the one or more artificial intelligence agents.

15. The computer program product of claim 12, wherein the document intelligence sub-system utilizes artificial intelligence or optical character recognition to extract text and structure from the data of the enterprise computer system and identify the one or more objectives.

16. The computer program product of claim 12, wherein the application modernization engine comprises an interaction management of the one or more artificial intelligence agents to modernize the enterprise computer system.

17. The computer program product of claim 12, wherein the application modernization engine comprises an interaction management between two or more supervised, assisted, and autonomous modernization agents of the one or more artificial intelligence agents.

18. The computer program product of claim 12, wherein the one or more artificial intelligence agents comprise two or more of a supervised agent, an assisted agent, and an autonomous modernization agents to implement the one or more processes and achieve the one or more objectives.

19. The computer program product of claim 12, wherein the application modernization engine provides the improved contextual document processing and specific information extraction by implementing modernization of the enterprise computer system with agent orchestration, interaction, communication, and suggesting improvements via the one or more artificial intelligence agents.

20. The computer program product of claim 12, wherein the application modernization engine implements the operations during a runtime of the enterprise computer system over.

* * * * *